US012591565B2

(12) United States Patent　(10) Patent No.:　US 12,591,565 B2
Wu et al.　(45) Date of Patent:　Mar. 31, 2026

(54) PREDICTING PURGE EFFECTS IN HIERARCHICAL DATA ENVIRONMENTS

(71) Applicant: SAP SE, Walldorf (DE)

(72) Inventors: Haipeng Wu, Shanghai (CN); Fen Li, Shanghai (CN); Lei Wang, Shanghai (CN); Feng Zhang, Shanghai (CN); Lai Wei, Shanghai (CN); Yunfeng Jiang, Shanghai (CN)

(73) Assignee: SAP SE, Walldorf (DE)

( * ) Notice: Subject to any disclaimer, the term of this patent is extended or adjusted under 35 U.S.C. 154(b) by 48 days.

(21) Appl. No.: 18/502,305

(22) Filed: Nov. 6, 2023

(65) Prior Publication Data

US 2025/0147951 A1　May 8, 2025

(51) Int. Cl.
*G06F 16/23*　(2019.01)
*G06F 16/16*　(2019.01)

(52) U.S. Cl.
CPC ........ *G06F 16/2379* (2019.01); *G06F 16/162* (2019.01)

(58) Field of Classification Search
CPC ........................... G06F 16/2379; G06F 16/162
See application file for complete search history.

(56) References Cited

U.S. PATENT DOCUMENTS

| | | | | |
|---|---|---|---|---|
| 10,572,448 | B1 * | 2/2020 | Donohue | G06F 16/2365 |
| 10,635,674 | B2 * | 4/2020 | Jain | G06F 16/24566 |
| 10,783,125 | B2 * | 9/2020 | Bester | G06F 16/2282 |
| 10,877,683 | B2 * | 12/2020 | Wu | G06F 3/0679 |
| 11,102,331 | B2 * | 8/2021 | Smith | H04L 43/0817 |
| 11,580,067 | B1 * | 2/2023 | Kuruvada | G06F 16/14 |
| 2014/0351201 | A1 * | 11/2014 | Hobart | G06F 16/125 |
| | | | | 707/603 |
| 2018/0081916 | A1 * | 3/2018 | Jaiswal | G06F 16/235 |
| 2019/0042609 | A1 * | 2/2019 | Senthilnathan | G06F 16/2423 |
| 2020/0242090 | A1 * | 7/2020 | Prasad | G06F 16/901 |
| 2020/0265305 | A1 * | 8/2020 | Budden | G06N 3/08 |
| 2021/0049510 | A1 * | 2/2021 | Adjaoute | G06N 20/00 |
| 2021/0089910 | A1 * | 3/2021 | Zheng | G06N 3/08 |
| 2021/0097039 | A1 * | 4/2021 | Denyer | H04L 63/20 |
| 2021/0201147 | A1 * | 7/2021 | Tu | G06F 18/2148 |
| 2021/0216355 | A1 * | 7/2021 | Cortez | G06F 9/5088 |
| 2021/0241131 | A1 * | 8/2021 | Khawas | G06F 16/214 |
| 2021/0271388 | A1 * | 9/2021 | Dwarampudi | G06F 11/3447 |
| 2022/0050597 | A1 * | 2/2022 | Kripalani | G06F 3/0608 |

* cited by examiner

*Primary Examiner* — Miranda Le
(74) *Attorney, Agent, or Firm* — SCHWEGMAN LUNDBERG & WOESSNER, P.A.

(57) ABSTRACT

Systems and methods described herein relate to the prediction of effects of data purging on data sources that are related through hierarchical data relationships. A purge request comprises a set of purge parameters that identify a data source and define one or more purge criteria for purging of data items of the data source. A plurality of impacted data sources is identified based on one or more hierarchical data relationships held by the data items of the data source. The impacted data sources include the data source and one or more additional data sources. The purge parameters are provided to a machine learning model to obtain output indicative of a predicted effect of execution of the purge request on the impacted data sources. The predicted effect is caused to be presented at the user device prior to the execution of the purge request.

18 Claims, 12 Drawing Sheets

PREDICTING PURGE EFFECTS IN HIERARCHICAL DATA ENVIRONMENTS

TECHNICAL FIELD

The subject matter disclosed herein generally relates to data purging. More specifically, but not exclusively, the subject matter relates to the prediction of effects of data purging on data sources that are related through hierarchical data relationships.

BACKGROUND

Data purging is an important task in many business environments. For example, data purging operations can free up storage space, improve system speeds, reduce costs, better protect sensitive information, or ensure compliance with data regulations, such as the European Union's General Data Protection Regulation (GDPR). A purging engine of a data purging system (e.g., a data purging system operating in a cloud-based environment) may, in response to a purge request, automatically perform a data purging process according to specified purge criteria.

Hierarchical data relationships between data items can impact a data purging process. For example, a purge request may indicate that certain "parent" data should be purged from a particular data source (e.g., records containing employee numbers are to be deleted from a human resources module). Other data sources may contain "child" data relying on the parent data (e.g., records of an information technology module that utilize the employee numbers to track computer equipment allocations). In some cases, the parent data and child data are then purged as part of the same purging operation. The effect of execution of a purge request can therefore be unpredictable. For example, when a user generates a new purge request that targets one module, the user has limited visibility into the storage space that will be freed up by the purge request, or the time it will take to execute the purge request, due to possible cascading purging in other modules caused by hierarchical data relationships.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
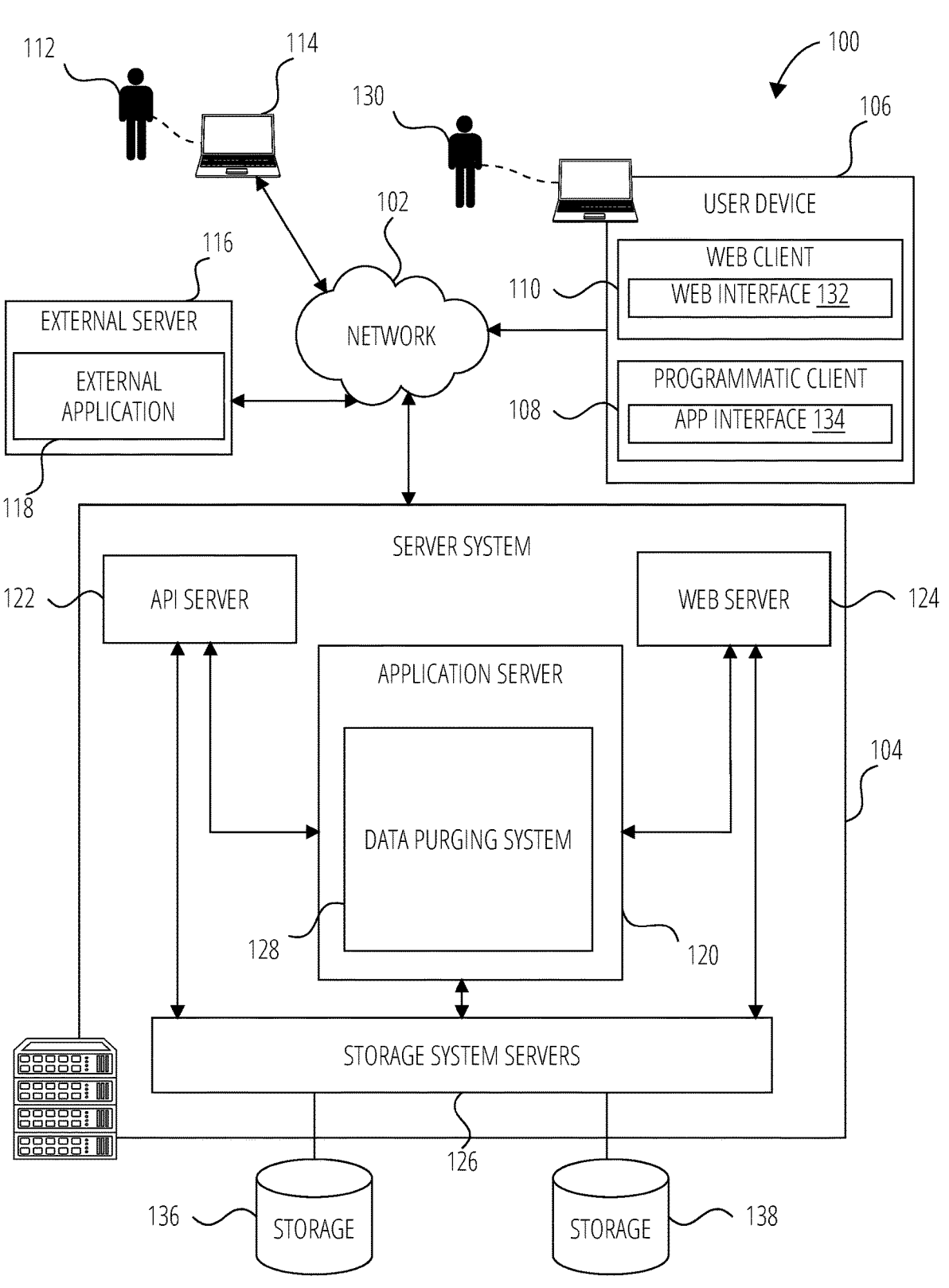
FIG. 1 is a diagrammatic representation of a network environment that includes a data purging system, according to some examples.

With modern computing systems hosting various types of data in cloud storage, it may be important for entities to manage constantly increasing data volumes. Executing regular data purges to delete certain data can be vital for controlling cloud-related costs (e.g., to ensure that storage needs, and thus costs, do not balloon out of control).

The term "data purging" (or simply "purging"), as used herein, generally refers to a process of deleting or removing data from a system or device. A data purge may be a soft purge or a hard purge. The term "soft purge," as used herein, refers to purging one or more data items in a reversible manner or in a manner that otherwise allows for recovery of the purged data. For example, a soft purge may involve marking a record in a table as "deleted," or transferring a file to a recycle bin from where it can be recovered. The term "hard purge," as used herein, refers to purging one or more data items in a permanent or irreversible manner. For example, a hard purge may involve removing a data item from all systems or devices, including backup systems or devices, in such a manner that the data item is not recoverable after the purging process (e.g., the hard purge cannot subsequently be reversed).

A purge request may specify or identify at least one data source. The term "data source," as used herein, refers to any collection or repository of data items, or a component or module associated with such a collection or repository, that can be acted upon as a logical unit. This may include, for example, functional modules within enterprise systems (e.g., human resources, information technology, payroll, or time management modules of a cloud-based enterprise service), databases, tables, data warehouses, files, or other logical groupings of data items that have some shared significance or purpose within a computing environment. A data source may comprise a subset of data from a larger data collection (e.g., a subset that is unified by common attributes, dependencies, business functions, or intended usage).

The term "data item," as used herein, refers to any unit, collection, or aggregation of data that can be stored digitally. A data item may comprise any type, structure, or format of data. Non-limiting examples of data items include a database record, a table, a file (e.g., a document, image, video, or audio file), a folder (e.g., a folder containing multiple files), an email message, a packet of raw data, a data object instance, a cell or row in a spreadsheet, a log entry or log file, or metadata associated with a data object.

Data sources, or data items associated with different data sources, may be arranged in hierarchical data relationships, where one data source or data item relies on or interacts with another. Data systems often utilize hierarchical data structures to organize and relate information. For example, in a business context, employee data may comprise foundational "parent" or "master" data that resides at a top level of a data hierarchy, not dependent on any other data. Lower levels of related data rely on the parent or master data. For example, data items used in time sheets or payroll typically rely on employee data, such as employee identifiers. Through a tree-like hierarchy (e.g., using foreign key relationships or dependencies), additional layers of connected data can branch from the parent data.

Hierarchical data relationships may include parent-child relationships or more complex structures with multiple connections or dependencies. Hierarchical data relationships may, for example, be found in data sources relating to organizational structures, enterprise resource planning systems, file systems, manufacturing systems, social networks, source code, or product catalogs.

When purging data items in a hierarchical data environment, it is often necessary to purge not only parent data items, but also their associated child or dependent data items. For example, this may be done to free up additional storage, ensure privacy, maintain data integrity (e.g., to avoid child records remaining in data systems in an "orphaned" state), or avoid anomalies, such as confusing outputs that reference records or identifiers that no longer exist. A purging engine may be configured to follow natural hierarchical data relationships, deleting downstream data before top-level data.

It may be desirable or even necessary to predict the impacts of data purges. For example, a company may have a 10 terabyte (TB) cloud storage quota contracted for a 3-year period. Advance purge planning may be required to ensure that the storage quota is not exceeded, or to plan for contract changes to the extent required. However, as a result of hierarchical data relationships between data items in different data sources, there may be a lack of visibility into a purge request's potential effects (e.g., the volume to be purged or expected completion time). For example, a user may generate a purge request to purge obsolete data from one data source that contains parent data items, without understanding the knock-on effect that the data purging process will have on child data items in other data sources. This may make it challenging to design an efficient purging routine.

Examples described herein leverage historical purge data to enable more accurate impact forecasting. A machine learning model may be trained to take the hierarchical nature of data items and the effects thereof on data purges (e.g., on the number of data items purged, the purge volume, or the data purge execution duration) into account. In some examples, the machine learning model comprises one or more feedforward neural networks (FNNs).

In some examples, the input parameters of a purge request and the outcome of the data purging process are parameterized, with purge requests being executed multiple times to obtain training data, thereby enabling the use of machine learning algorithms to build a connection between the input parameters and the outcome of the data purging process. A system collects input parameters (also referred to herein as "purge parameters") and output results from previously executed data purge jobs. The parameters and results may be formatted into multi-dimensional arrays, and split into training and testing sets. In some examples, the parameters and results are grouped and the groups are utilized in the training process.

The machine learning model may train on the training set, learning relationships between input parameters and output results. When a new data purge job arises, the system may take the input parameters and generate output using the machine learning model. The output may be indicative of a predicted effect of execution of the relevant purge request.

A method may include receiving, from a user device, a purge request that comprises a set of purge parameters. The user device may be associated with a user account held with a cloud-based service. The purge parameters identify a data source and define one or more purge criteria for purging of data items of the data source. Examples of purge parameters include: an identifier of the data source, the one or more purge criteria, user data, a purge scope, a data retention policy, a purge date, or a purge time.

The method may include identifying, based on one or more hierarchical data relationships held by the data items of the data source, a plurality of impacted data sources. The impacted data sources may include the data source and one or more additional data sources. In some examples, impacted data sources are used as purge parameters.

The term "primary data source," as used herein, refers to a data source that is specified in the purge request, or which the purge request is specifically targeted at. A purge request may have multiple primary data sources. A primary data source may also be referred to as a "target data source." The term "secondary data source," as used herein, refers to a data source that is not specified in the purge request, or which the purge request is not specifically targeted at, but which will be affected by execution of the data purge request due to existing hierarchical data relationships (e.g., a data structure that will cause a purging engine to purge child data from the secondary data sources together with parent data from the primary data source). A secondary data source may thus be identified as an additional data source impacted by a purge. Each impacted data source may correspond to a respective functional module of the cloud-based service.

The method may include identifying the one or more hierarchical data relationships based on relationships or dependencies, such as one or more parent-child relationships, between first data items of the primary data source and second data items of the one or more secondary data sources. In some examples, the machine learning model generates the output based on learned connections without having to identify the hierarchical data relationships.

The purge parameters of the purge request may be provided to a machine learning model to obtain output indicative of the predicted effect of execution of the purge request on the impacted data sources. In some examples, the purge parameters from the purge request may be provided together with one or more additional purge parameters that identify the impacted data sources (or at least a subset of the impact data sources, such as the secondary data sources). In other words, in some examples, parameters specified by the user together with identifiers of the impacted data sources may be provided as input to the machine learning model.

The predicted effect may, for example, be a predicted purge volume, a predicted number of data items purged, or a predicted data purge execution duration. In some examples, the predicted effect is presented at the user device prior to the execution of the purge request. For example, a user interface, such as a purge management interface, may present the predicted effect at the user device in relation to the purge request. The user may finalize the purge request (e.g., cause it to be submitted for execution) or adjust the purge request.

The method may include receiving, from the user device, user input to adjust the set of purge parameters of the purge request (e.g., after the user has reviewed a first predicted effect). The purge parameters may be adjusted, and the adjusted purge parameters may be provided to the machine learning model to obtain adjusted output indicative of a second predicted effect of the execution of the purge request. The second predicted effect may then be presented at the user device.

Adjustment of the purge parameters may change the impacted data sources. For example, as a result of the change in the purge parameters, the primary data source may change, one or more of the secondary data sources may no longer be impacted, or one or more additional secondary data sources may become impacted data sources. The adjustment of the set of purge parameters may thus cause identification of a second set of impacted data sources, with the adjusted output being indicative of the predicted effect of the execution of the purge request on the second set of impacted data sources.

In some examples, the predicted effect generated by the machine learning model comprises a data source-specific effect for each of the impacted data sources. In other words, the machine learning model may generate a separate result or impact prediction for each impacted data source. The data source-specific effects may be separately presented at the user device. In some cases, the predicted effect generated by the machine learning model comprises an overall effect that covers all of the impacted data sources (as opposed to generating a separate result or impact prediction for each impacted data source).

The output of the machine learning model may be used in various downstream operations. In some examples, a data purging system automatically schedules the execution of the data purge request based on the predicted effect. A processor-implemented purging component (e.g., a purging engine) then executes the purge request in accordance with the scheduling.

As mentioned, the machine learning model may be trained on historical purge data. The historical purge data may include a plurality of input-output pairs, with each input-output pair including a set of purge parameters and at least one corresponding purge effect. For example, the purge parameters of a particular input-output pair may identify a target or primary data source for a purge request associated with the input-output pair, together with one or more purge criteria used in that specific purge request.

In some examples, the purge effect of each input-output pair is specific to an impacted data source. In other words, the purge effect in the output of the input-output pair may relate only to one data source, e.g., one impacted functional module. Execution of one purge request may thus result in creation of multiple input-output pairs, each corresponding to a different data source. The input-output pairs may be grouped by impacted data source, and the machine learning model may be trained using such grouped input-output pairs.

In other cases, the purge effect of each input-output pair covers all impacted data sources. In other words, the purge effect in the output of the input-output pair may relate to multiple data sources, e.g., multiple impacted functional modules. Execution of one purge request may thus result in creation of a single input-output pair, in which case the machine learning model may be trained without grouping of input-output pairs.

Examples described herein may address or alleviate technical problems associated with data purging systems. For example, accurate predictions of data storage needs and growth rates may be enabled by analyzing historical purge data that include data with hierarchical data relationships, thus improving the management of storage capacity and reducing storage costs. Furthermore, issues such as abnormal data increases (e.g., abnormal spikes in data growth due to bugs or misconfigurations) or unexpected, cascading purging of downstream data, may be detected and addressed.

In some examples, purge job scheduling can be optimized by providing a purge job scheduling component of a data purging system with an accurate impact prediction that is useful in allocating appropriate computing resources to a purge job. This may improve the functioning of the data purging system, including its overall efficiency in executing purge jobs.

The machine learning-driven techniques described herein may further improve the functioning of a data purging system by enabling users to preview purge results for specified purge parameters. As mentioned, the purge results may be indicative of the impact that a proposed purge may have on one or more impacted data sources. This can empower users to make data-driven decisions when configuring and scheduling purge routines. By accounting for hierarchical data relationships, users may be provided with better visibility into the impacts of a purge request prior to execution thereof.

When the effects in this disclosure are considered in aggregate, one or more of the methodologies described herein may obviate a need for certain efforts or resources that otherwise would be involved in data storage systems, data purging processes or data purging management, such as reactive adjustments of purging schedules or purge job settings resulting from storage capacity issues. Examples of such computing resources may include processor cycles, network traffic, memory usage, graphics processing unit (GPU) resources, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 130. The user 130 may, for example, be a customer accessing one or more products or services provided by a service provider via the server system 104. Examples of the products or services are provided below. An administrator 112, such as an administrator associated with the service provider, may also access the server system 104 via the network 102 (e.g., by using an administrator device 114).

A web client 110 (e.g., a browser) or a programmatic client 108 (e.g., an "app") may be hosted and executed on the user device 106. Although not shown in FIG. 1, the administrator device 114 of the administrator 112 may be similar to the user device 106 and also host and execute a similar web client or programmatic client.

An Application Program Interface (API) server 122 and a web server 124 provide respective programmatic and web interfaces to components of the server system 104. A specific application server 120 hosts a data purging system 128 which includes components, modules, or applications. Storage system servers 126 host or provide access to a storage system. For example, the storage system may be a distributed cloud-based storage system, such as a Hadoop Distributed File System (HDFS).

The user device 106 can communicate with the application server 120. For example, communication can occur via the web interface supported by the web server 124 or via the programmatic interface provided by the API server 122. It will be appreciated that, although only a single user device 106 is shown in FIG. 1, a plurality of user devices may be communicatively coupled to the server system 104 in some examples. Further, while certain functions may be described herein as being performed at either the user device 106 or administrator device 114 (e.g., web client 110 or programmatic client 108) or the server system 104, the location of certain functionality either within the user device 106 or administrator device 114, or the server system 104, may be a design choice.

The application server 120 is communicatively coupled to the storage system servers 126, facilitating access to one or more information storage repository, such as storage 136 or storage 138. The storage 136 or storage 138 may, for example, include one or more databases or file systems. In some examples, the storage system servers 126 provide access to storage devices that store data items to be purged by the data purging system 128 (e.g., files, records, or logs). In some examples, the storage system servers 126 may also be accessed by the user 130 using the user device 106 (e.g., to add new files or modify files), or by the administrator 112 using the administrator device 114. The storage system servers 126 may be accessed directly, or via the API server 122 or web server 124, depending on the implementation.

The application server 120 accesses application data (e.g., application data stored by the storage system servers 126) to provide one or more applications or software tools to the user device 106 or the administrator device 114 (e.g., via a web interface 132 or an app interface 134). As described further below according to examples, the application server 120, using the data purging system 128, may provide one or more tools or functions for performing data purges and predicting the effect of data purges on one or more data sources (e.g., predicting volume changes, number numbers of data items removed, or purge duration).

In some examples, the server system 104 is part of a cloud-based platform or cloud-based service provided by a software provider that allows the user 130 to utilize features of one or more of the storage system servers 126 and the data purging system 128. The user 130 may utilize one or more software offerings of the software provider, such as a data storage solution, an accounting module, a human resources module, a planning module, or an enterprise resource planning module. These modules may be regarded as functional modules of the cloud-based platform or cloud-based service. Such functional modules may represent respective data sources that can be targeted or selected for purging, as described further below. For each data source or module, the server system 104 may cause data items to be stored in the storage 136 or storage 138.

For example, the user 130 may store data items via the storage system servers 126 and make use of the data purging system 128 to perform purges according to one or more purge policies (e.g., to ensure compliance with data retention regulations). Different purge policies may be applied to different offerings or modules, or even within the same offering or module. In some examples, the user 130 can transmit a purge request to initiate or cause scheduling of a data purge. The user 130 may upload one or more purge policies to the data purging system 128 via the user device 106. The data purging system 128 then uses each purge policy to schedule purge jobs.

In some examples, the data purging system 128 is a centralized system configured to execute automated data purging operations on one or more storage systems associated with an enterprise based on defined purge policies. The data purging system 128 provides a platform to apply retention rules for deleting obsolete, redundant, or unnecessary data. The data purging system 128 may also delete specific or custom data items on request.

The data purging system 128 may generate predictions to provide the user 130 or administrator 112 with visibility into an expected or predicted effect of a data purge (or a series of data purges). The data purging system 128 may also provide one or more dashboards via a graphical user interface on the user device 106 or the administrator device 114, such as a dashboard that allows the user 130 or administrator 112 to create, adjust, track, monitor, or manage data purges. The graphical user interface may also present the predictions referred to herein.

As mentioned, the storage system servers 126 may provide access to a distributed storage system that is accessed by the data purging system 128 to purge data. Purging may be performed to free up storage space or reduce costs, and may be driven by user instructions, purge policies, or regulatory compliance (e.g., a law requiring data to be completely removed from a system after a certain period). In some examples, the distributed storage system comprises a HDFS or other distributed file system (DFS). A DFS is a file system that enables clients to access file storage from multiple hosts through a computer network. Files may be spread across multiple storage servers in multiple locations, and hierarchical data relationships may exist between files. In some examples, a DFS can be designed so that geographically distributed users, such as remote workers and distributed teams, can access and share files remotely as if they were stored locally.

A DFS may cluster together multiple storage nodes that each have their own computing power and storage and distribute data sets across multiple nodes. In some examples, data items are replicated onto multiple servers, which enables redundancy to keep data highly available. The data on a DFS can reside on various types of storage devices, such as solid-state drives and hard disk drives, and examples described herein are not restricted to a particular type of storage device.

One or more of the application server 120, the data purging system 128, the storage system servers 126, the API server 122, the web server 124, or parts thereof, may each be implemented in a computer system, in whole or in part, as described below with respect to FIG. 12. In some examples, external applications, such as an external application 118 executing on an external server 116, can communicate with the server system 104 via the programmatic interface provided by the API server 122. For example, a third-party application may support one or more features or functions on a website or platform hosted by a third party, or may perform certain methodologies and provide input or output information to the server system 104 for further processing or publication. The external application 118 may, for example, access the storage system servers 126 to view or modify files, or access the data purging system 128 to view the status of data purge jobs or data purge effect predictions.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

One or more of the components in FIG. 1 may be implemented using hardware (e.g., one or more processors of one or more machines) or a combination of hardware and software. For example, a component may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 2:
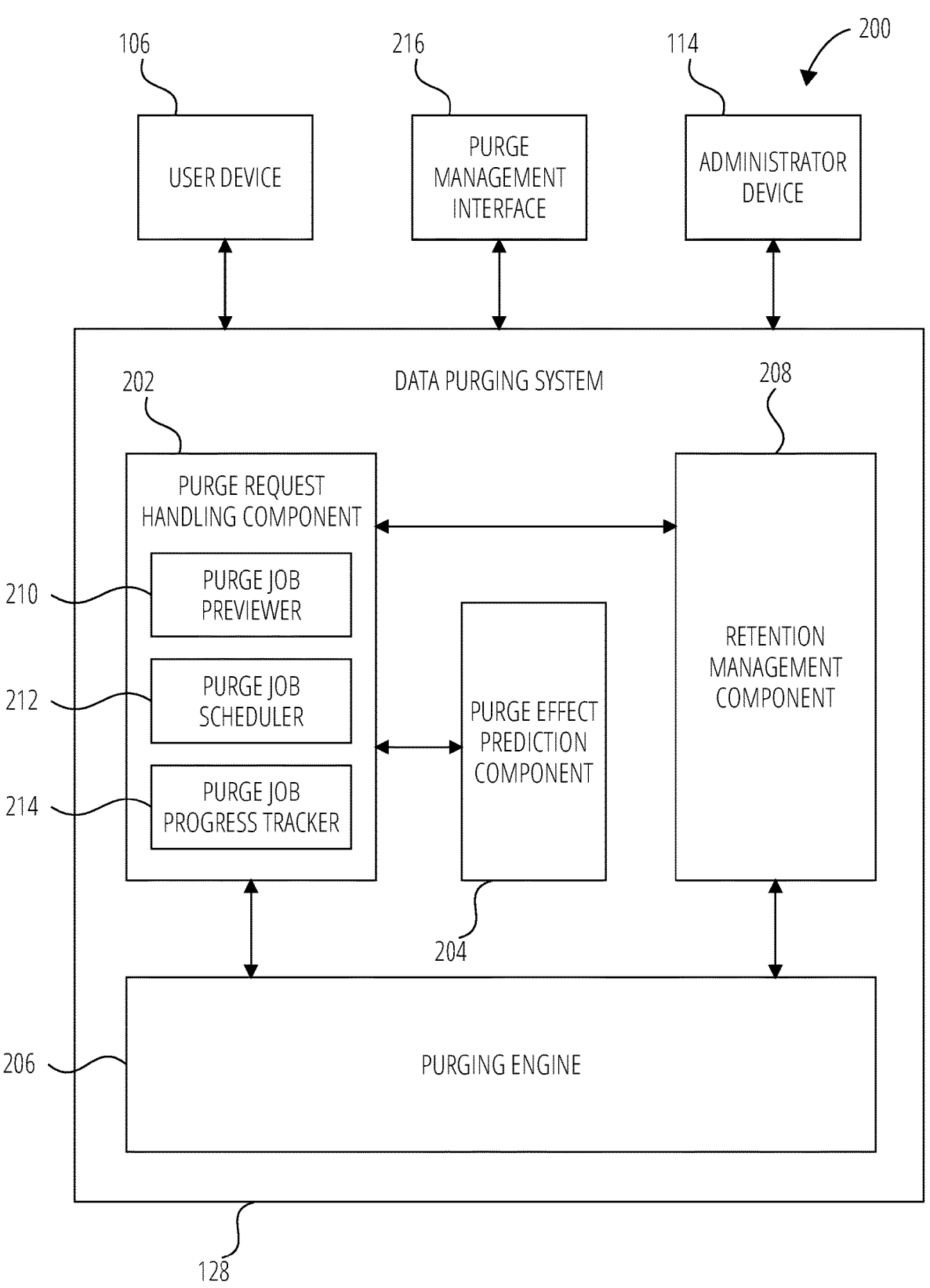
FIG. 2 is a diagrammatic representation of a data purging system that includes a purge effect prediction component, according to some examples.

FIG. 2 is a diagram 200 that illustrates components of the data purging system 128 of FIG. 1, according to some examples. FIG. 2 also shows the user device 106 and the administrator device 114 of FIG. 1, which are communicatively coupled with the data purging system 128. The data purging system 128 is shown to include a purge request handling component 202, a purge effect prediction component 204, a purging engine 206, and a retention management component 208.

The purge request handling component 202 may provide an interface for users or administrators to create or submit purge requests (e.g., by uploading purge policies or creating once-off purge jobs) and view purge effect predictions. The purge request handling component 202 may include a purge job previewer 210 that provides at least some of these functions.

In some examples, the purge job previewer 210 works with the purge effect prediction component 204 to provide, at the user device 106 or administrator device 114, a preview of the predicted effects for a given purge request. The purge job previewer 210 may retrieve purge parameters entered by a user and transmit them to the purge effect prediction component 204. The purge effect prediction component 204 then applies a machine learning model to generate predicted effects or metrics, such as purged volume and duration. These predicted effects are returned to the purge job previewer 210.

The purge job previewer 210 may format predictions into graphical and textual analytics displayed at a user interface, such as a purge management interface 216 shown in FIG. 2. The purge job previewer 210 may provide data-backed insights into the possible impacts of specified purge configurations prior to execution. This may enable informed decision-making when planning and scheduling data purge routines. The purge management interface 216 can be accessed by the user device 106 or the administrator device 114, in some examples. More detailed, non-limiting examples of the purge management interface 216 are described with reference to FIG. 9 and FIG. 10 below.

The purge request handling component 202 may also handle the scheduling and tracking of purge jobs. To this end, the purge request handling component 202 may include a purge job scheduler 212 and a purge job progress tracker 214. The purge job scheduler 212 functions as a scheduling component of the data purging system 128. The purge job scheduler 212 may be configured to receive purge requests and establish schedules for automated purge jobs (e.g., recurring or once-off data purging processes).

The purge job scheduler 212 may trigger the purging engine 206 at the appropriate times to act on deleting data based on the relevant purge policies or purge criteria (e.g., by way of hard or soft purging). In some examples, the purge job scheduler 212 utilizes predictions generated by the purge effect prediction component 204 to schedule purge jobs (e.g., to match the predicted resources required by a purge job to suitable computing resources). In this way, these predicted effects may be utilized to improve resource utilization.

The purge job progress tracker 214 functions as a monitoring component of the data purging system 128. The purge job progress tracker 214 may be configured to track the status and progress of purge requests (e.g., scheduled purge jobs) as they execute. The purge job progress tracker 214 may provide visibility into ongoing and historical purge operations across various storage systems (e.g., via the purge management interface 216).

Referring now specifically to the purge effect prediction component 204, the purge effect prediction component 204 operates to generate predictions or forecasts of data purge effects. In some examples, the purge effect prediction component 204 utilizes machine learning techniques, as described elsewhere herein. The purge effect prediction component 204 receives new purge requests (which may be "draft" requests that have not been finalized or submitted, or finalized requests) and outputs metrics, such as expected purge volume, executed data purge execution duration, or expected number of data items purged. In this way, the purge effect prediction component 204 may bring visibility into data purge executions pre-runtime.

The purging engine 206 is a processor-implemented component that executes data purges in response to purge requests. The purging engine 206 determines the appropriate purging logic to apply based on the relevant purge policy, one or more purge criteria, or other factors, such as the capabilities or limitations of the target data source. The purging engine 206 may leverage bulk operations for efficiency in deleting large volumes of data.

In use, the purging engine 206 may connect to a storage system, such as a DFS, and delete or overwrite the specific data being requested for purge by the purge request handling component 202. The nature of purging operations may depend on the implementation, and can include operations such as deleting files, overwriting file blocks, and updating metadata. In examples described herein, purging operations may include hard purges or soft purges, or combinations thereof. The purging engine 206 may access purge requests from the purge request handling component 202 and process the purge requests (e.g., in batches). For each request, the purging engine 206 may locate the relevant files or blocks to purge based on criteria, such as timestamps, file paths, or data identifiers, and then execute the purging operation.

The purging engine 206 may notify the purge request handling component 202 that a purge request was successfully processed. In some examples, if a purge operation (or part thereof) fails, the purging engine 206 may notify the purge request handling component 202 of the failure. For example, the purging engine 206 may notify the purge request handling component 202 of an error, such as an incorrect or incomplete purge, together with an indication of the data items impacted by the error. The purge request handling component 202 may then transmit a notification of the error to the user device 106 or the administrator device 114 (e.g., via the purge management interface 216).

The retention management component 208 functions as a policy management component of the data purging system 128. For example, the retention management component 208 may contain purge policies or other rules or settings governing the purging of data items. For example, the retention management component 208 may regulate how data attributes, such as file type, age, modification information, and other metadata are evaluated against purge policies, purge scope, or purge criteria to determine purge eligibility. The retention management component 208 may communicate with the purge request handling component 202 to schedule purge jobs at the appropriate times, and with the purging engine 206 to ensure that purging rules and criteria are applied.

As mentioned, the user device 106 or the administrator device 114 may be enabled to access the purge management interface 216. For example, the user device 106 may access the purge management interface 216 via the web interface 132 or the app interface 134 of FIG. 1. The purge management interface 216 may allow the user 130 to submit or change instructions (e.g., create or adjust purge parameters) that are then provided to the retention management component 208 or the purge request handling component 202. The purge management interface 216 may further aggregate information from the purge job progress tracker 214 to provide the user 130 with a dashboard indicating the status of various data purging processes.

The architecture as shown in FIG. 2 may integrate easily with existing purging engines and storage systems. In some examples, at least some of the components shown in FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 3:
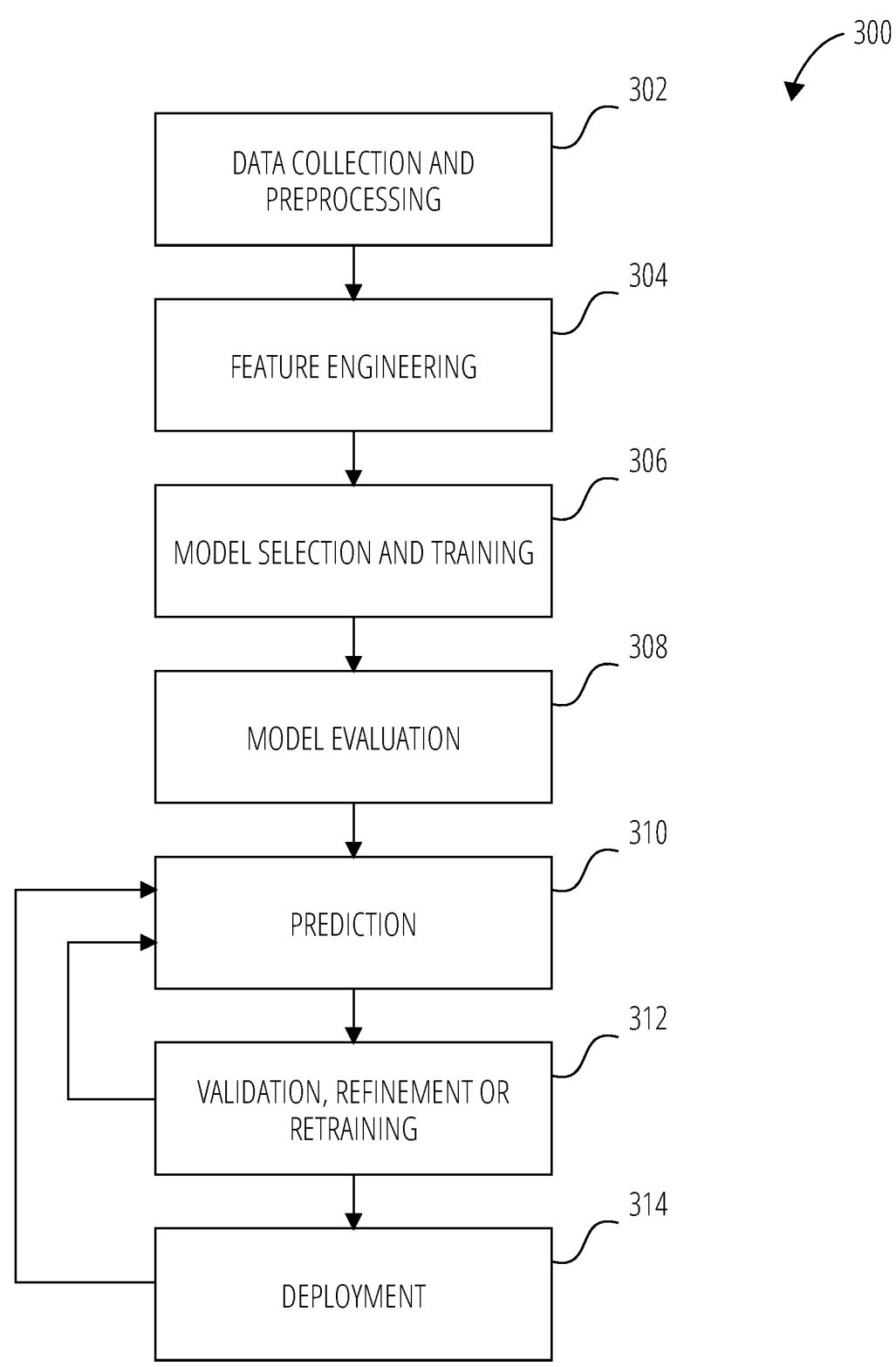
FIG. 3 diagrammatically illustrates a machine learning pipeline, according to some examples.

As mentioned above, in some examples, the input parameters of a purge request and the outcome of the data purging process are parameterized, and machine learning algorithms may be used to build a connection between the input parameters and the outcome of the data purging process. FIG. 3 is a flowchart providing an overview of a machine learning pipeline 300, according to some examples. The machine learning pipeline 300 may be used to generate a trained model, such as the trained machine learning program 402 shown in the diagram 400 of FIG. 4.

Broadly, machine learning may involve using computer algorithms to automatically learn patterns and relationships in data, potentially without the need for explicit programming. Machine learning algorithms may be divided into three main categories: supervised learning, unsupervised learning, and reinforcement learning.

Supervised learning involves training a model using labeled data to predict an output for new, unseen inputs. Examples of supervised learning algorithms may include linear regression, decision trees, and neural networks.

Unsupervised learning involves training a model on unlabeled data to find hidden patterns and relationships in the data. Examples of unsupervised learning algorithms may include clustering, principal component analysis, and generative models, such as autoencoders.

Reinforcement learning involves training a model to make decisions in a dynamic environment by receiving feedback in the form of rewards or penalties. Examples of reinforcement learning algorithms may include Q-learning and policy gradient methods.

Logistic regression models the probability of a binary response variable based on one or more predictor variables. Another example type of machine learning algorithm is Naïve Bayes, which is a supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data.

Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms may include decision trees, k-nearest neighbors, clustering algorithms, and deep learning algorithms, such as convolutional neural networks (CNN), recurrent neural networks (RNN), and transformer models. The choice of algorithm may depend on the nature of the data, the complexity of the problem, and the performance requirements of the application.

The performance of machine learning models may be evaluated on a separate test set of data that was not used during training to ensure that the model can generalize to new, unseen data. Although several specific examples of machine learning algorithms are discussed herein, the principles discussed herein can be applied to other machine learning algorithms as well. Deep learning algorithms, such as CNNs, RNNs, and transformers, as well as more traditional machine learning algorithms like decision trees, Random Forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Generating a trained machine learning program 402 may include multiple phases that form part of the machine learning pipeline 300, including, for example, the following phases illustrated in FIG. 3:

Data collection and preprocessing 302: This phase may include acquiring and cleaning data to ensure that it is suitable for use in the machine learning model. This phase may also include removing duplicates, handling missing values, and converting data into a suitable format.

Feature engineering 304: This phase may include selecting and transforming the training data 406 to create features that are useful for predicting the target variable/s. Feature engineering may include (1) receiving features 408 (e.g., as structured or labeled data in supervised learning) and/or (2) identifying features 408 (e.g., unstructured or unlabeled data for unsupervised learning) in training data 406.

Model selection and training 306: This phase may include selecting an appropriate machine learning algorithm and training it on the preprocessed data. This phase may further involve splitting the data into training and testing sets, using cross-validation to evaluate the model, and tuning hyperparameters to improve performance.

Model evaluation 308: This phase may include evaluating the performance of a trained model (e.g., the trained machine learning program 402) on a separate testing dataset. This phase can help determine if the model is overfitting or underfitting and determine whether the model is suitable for deployment.

Prediction 310: This phase involves using a trained model (e.g., trained machine learning program 402) to generate predictions on new, unseen data.

Validation, refinement or retraining 312: This phase may include updating a model based on feedback generated from the prediction phase, such as new data or user feedback.

Deployment 314: This phase may include integrating the trained model e.g., the trained machine learning program 402) into a more extensive system or application, such as a web service, mobile app, or Internet of Things (IoT) device. This phase can involve setting up APIs, building a user interface, and ensuring that the model is scalable and can handle large volumes of data.

Figure 4:
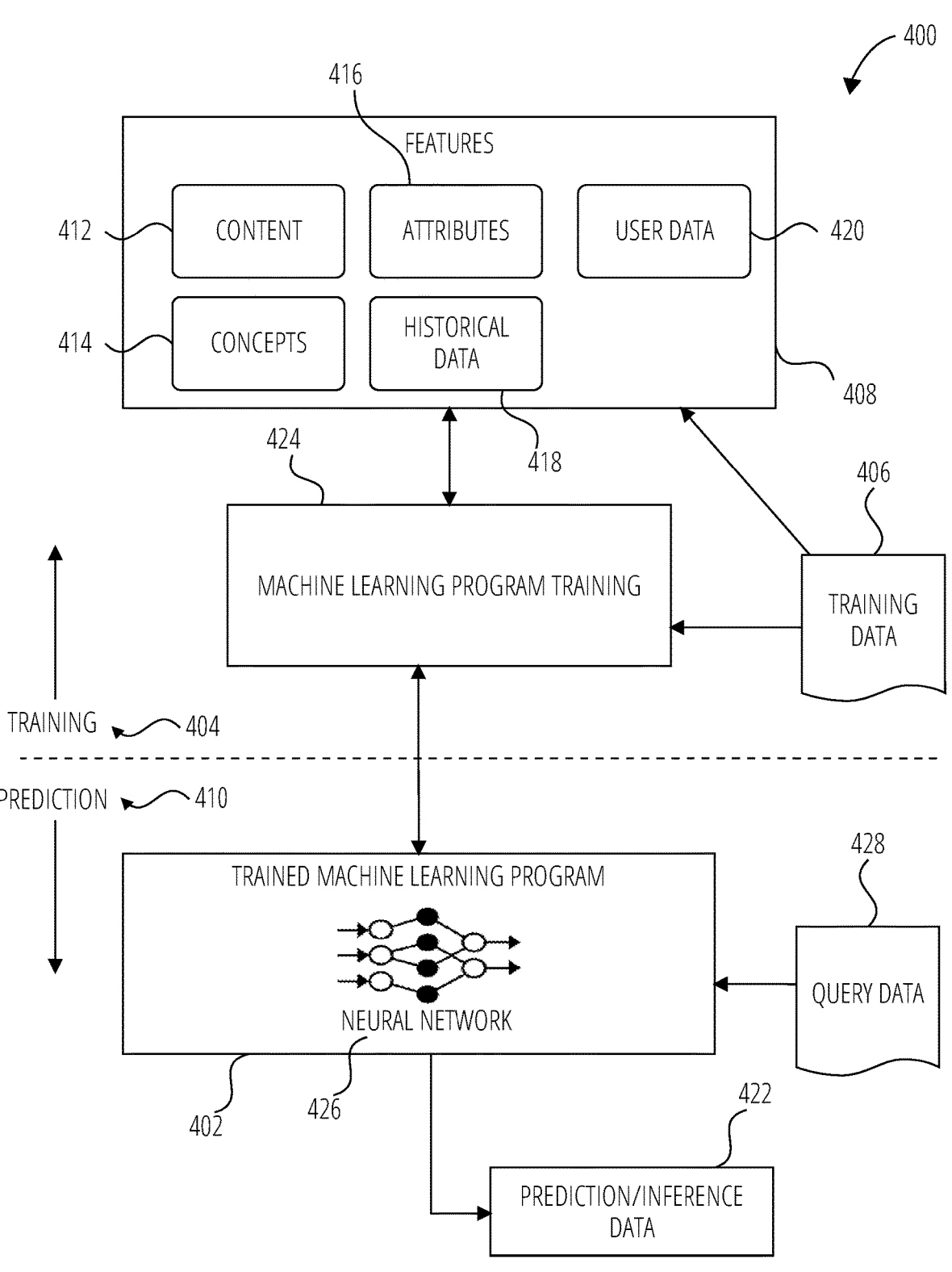
FIG. 4 diagrammatically illustrates training and use of a machine learning program, according to some examples.

FIG. 4 illustrates further details of two example phases, namely a training phase 404 (e.g., part of model selection and training 306) and a prediction phase 410 (part of prediction 310). Prior to the training phase 404, feature engineering 304 is used to identify features 408. This may include identifying informative, discriminating, and independent features for effectively operating the trained machine learning program 402 in pattern recognition, classification, or regression. In some examples, the training data 406 includes labeled data, known for pre-identified features 408 and one or more outcomes. Each of the features 408 may be a variable or attribute, such as an individual measurable property of a process, article, system, or phenomenon represented by a data set (e.g., the training data 406). Features 408 may also be of different types, such as numeric features, strings, and graphs, and may include one or more of content 412, concepts 414, attributes 416, historical data 418, and/or user data 420, merely for example. In some examples, the features 408 include input parameters of purge requests, as described further below.

In training phase 404, the machine learning program may use the training data 406 to find correlations among the features 408 that affect a predicted outcome or prediction/inference data 422. With the training data 406 and the identified features 408, the trained machine learning program 402 is trained during the training phase 404 during machine learning program training 424. The machine learning program training 424 appraises values of the features 408 as they correlate to the training data 406. The result of the training is the trained machine learning program 402 (e.g., a trained or learned model).

Further, the training phase 404 may involve machine learning, in which the training data 406 is structured (e.g., labeled during preprocessing operations). The trained machine learning program 402 may implement a neural network 426 capable of performing, for example, classification or clustering operations. In other examples, the training phase 404 may involve deep learning, in which the training data 406 is unstructured, and the trained machine learning program 402 implements a deep neural network 426 that can perform both feature extraction and classification/clustering operations.

In some examples, a neural network 426 may be generated during the training phase 404, and implemented within the trained machine learning program 402. The neural network 426 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 426 may operationally compute a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 426 may also be one of several different types of neural networks, such as a feedforward neural network (FNN), a Multilayer Perceptron (MLP), an Artificial Neural Network (ANN), a RNN, a Long Short-Term Memory Network (LSTM), a Bidirectional Neural Network, a symmetrically connected neural network, a Deep Belief Network (DBN), a CNN, a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

Referring specifically to FNNs, a FNN is a neural network in which connections between nodes do not form a cycle. In an FNN, information moves forward from the input layer to the output layer without looping back. Specifically, an FNN consists of an input layer, one or more hidden layers, and an output layer. During training, the FNN processes input data through the network and compares the resulting output to the desired output. For example, predicted effects for specific purge parameters can be compared to actual effects in training data, as described herein. Errors between the desired and actual outputs are then propagated backwards to adjust the weights and biases of the neurons. This process is repeated with many input examples until the network minimizes the errors and can accurately map arbitrary inputs to outputs. Once trained, the FNN can receive new input data and predict the output. The multiple layers and non-linear activations in the network enable FNNs to learn complex relationships between high-dimensional input and output data.

In addition to the training phase 404, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In the prediction phase 410, the trained machine learning program 402 uses the features 408 for analyzing query data 428 to generate inferences, outcomes, or predictions, as examples of prediction/inference data 422. For example, during prediction phase 410, the trained machine learning program 402 generates an output. Query data 428 is provided as an input to the trained machine learning program 402, and the trained machine learning program 402 generates the prediction/inference data 422 as output, in response to receipt of the query data 428.

Figure 5:
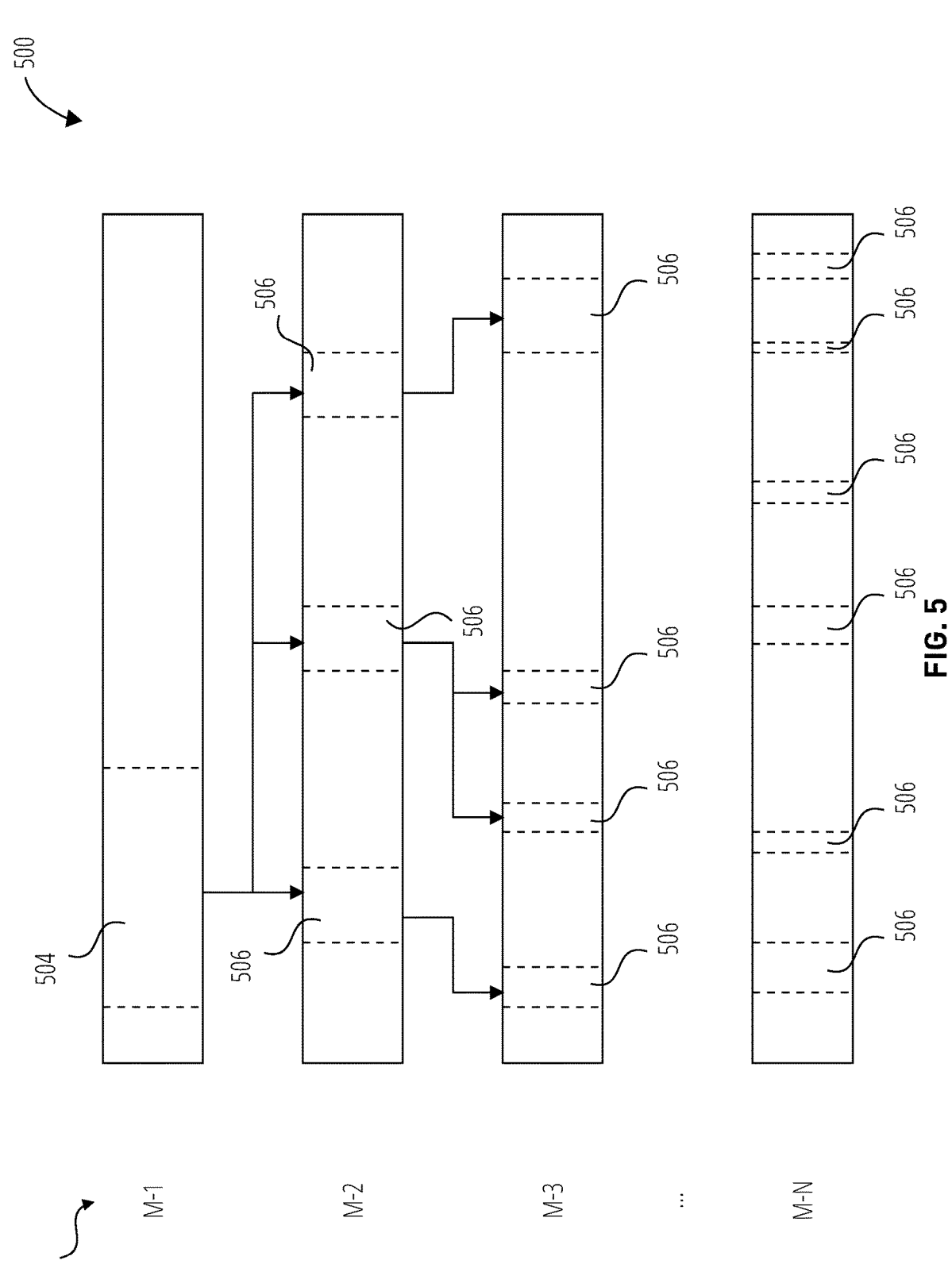
FIG. 5 diagrammatically illustrates an effect of hierarchical data relationships, that exist between data items in different data sources, on a data purging process, according to some examples.

Referring now to FIG. 5, a data storage system 500 is shown. The data storage system 500 may, for example, be provided as part of a cloud-based service that is implemented using the server system 104 of FIG. 1.

The data storage system 500 includes a plurality of data sources 502, shown in FIG. 5 as data source M-1 to data source M-N. The data sources 502 are associated with a user, such as the user 130 of FIG. 1. The user 130 may hold a user account with the cloud-based service. As described elsewhere, the data sources 502 may be associated with or linked to respective functional modules of the cloud-based service. For example, data source M-1 may represent a human resource module, while data source M-2 represents a payroll module.

In other examples, the data sources M-1 to M-N may represent relatively larger systems that provide multiple functionalities. For example, the data source M-1 may represent an enterprise resource planning system of the user 130, while the data source M-2 represents a customer relationship management system of the user 130.

A purge request specifies that certain target data items 504 are to be purged from data source M-1. The data source M-1 is therefore a primary data source (or target data source) in the example of FIG. 5. The target data items 504 constitute a subset of the data items that are stored in, or associated with, the data source M-1, as illustrated by broken lines in FIG. 5. In other examples, all data in, or associated with, the data source M-1 may be purged in terms of a purge request.

The target data items 504 are determined (e.g., by the purge request handling component 202 or purge effect prediction component 204 of FIG. 2) based on a set of purge parameters. The purge parameters may be input by the user 130 or administrator 112. Some or all purge parameters may be retrieved by accessing a purge policy associated with the relevant user account (e.g., the data purging system 128 may automatically create a purge request based on a previously submitted purge policy). For example, one or more of the following purge parameters may be specified or associated with a purge request:

Account identifier;

An identifier of the primary data source (e.g., data source M-1);

User scope (e.g., whose data are to be purged);

A data retention policy (e.g., all data items last modified more than 3 years ago are to be purged);

A purge date;

A purge time; or

Other purge criteria (e.g., only purge inactive user data, or only purge data relating to a specific territory).

In order to train a machine learning model to generate predictions, a fixed set of purge parameters may be selected as input data. The following set of purge parameters is used as a first non-limiting example below.

Primary data source or target data source (PM)

User scope (U)

Retention criteria (R)

Purge date (D)

Other purge criteria (P)

The scope of the target data items 504 may thus be defined by the set of purge parameters (PM, U, R, D, P). As a result of hierarchical data relationships between the target data items 504 and data items in the other (additional) data sources M-2 to M-N, execution of the purge request will not only result in purging (e.g., hard purging) of the target data items 504 from the data storage system 500, but also the related data items in the other (additional) data sources M-2 to M-N. These related data items are indicated as dependent data items 506 in FIG. 5. The dependent data items 506 make up subsets of the data items that are stored in, or associated with, the respective data sources M-2 to M-N, as is also illustrated by broken lines in FIG. 5.

Referring generally to FIG. 5, layers of interdependencies between the data items 504 and 506 are thus conceptually illustrated. For example, the dependent data items 506 may include child data that the purging engine 206 purges at the same time as purging parent data forming part of the target data items 504. As described above, this technique could, for instance, be implemented to avoid having "orphaned" data in the data storage system 500 or to avoid providing confusing or incorrect search results to a user of the cloud-based service.

Still referring to FIG. 5, the data source M-1 is the primary data source PM, while the data sources M-2 to M-N are secondary data sources. The primary data source and the secondary data sources may collectively be referred to as "impacted" data sources (IM), given that the execution of the purge request impacts data items in the primary and secondary data sources. The data source M-1 is thus both a primary data source (PM) and an impacted data source (IM).

In some cases, the impacted data sources (IM) are also applied as purge parameters when training a machine learning model. The following set of purge parameters is thus used as a second non-limiting example below.

Primary data source or target data source (PM)

Impact module(s) (IM)

User scope (U)

Retention criteria (R)

Purge date (D)

Other purge criteria (P)

While two example purge parameter sets are provided above, it will be appreciated that various other purge parameters may be employed in other examples.

Figure 6:
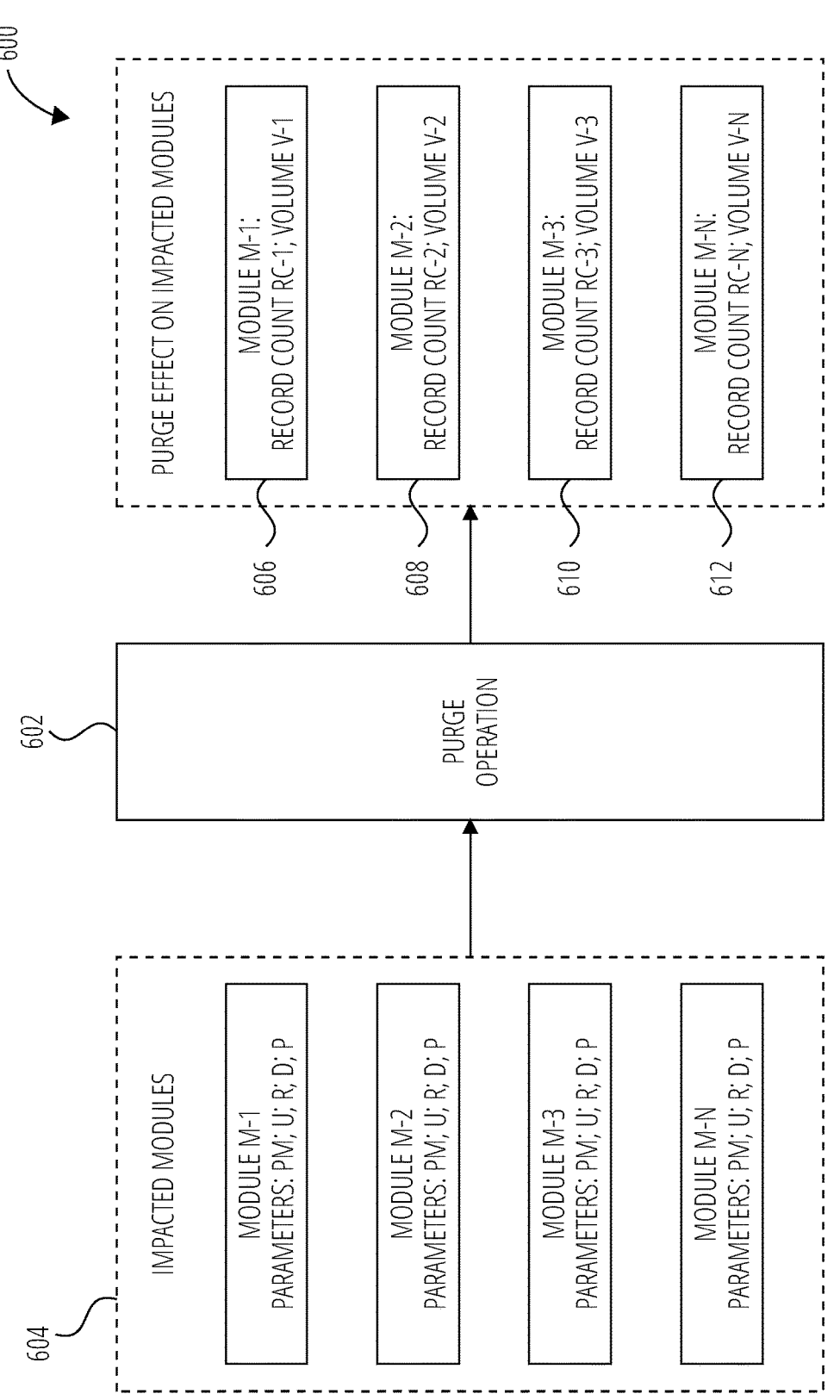
FIG. 6 diagrammatically illustrates a plurality of impacted modules and effects of purging on the respective impacted modules, according to some examples.

Turning now to FIG. 6, a diagram 600 is shown to illustrate the effects of a purge operation 602 on a set of impacted data sources. In the diagram 600, the impacted data sources are impacted modules 604 (M-1 to M-N) that each correspond to a respective functional module of a cloud-based enterprise service.

A purge request has a set of input parameters (PM, U, R, D, P) as described in the first example above and, for each of the impacted modules 604, the purge operation 602 has a purge effect. In the example of FIG. 6, the purge effect is measured or assessed by considering two outputs: record count (RC) and volume (V). Record count refers to the number of data items purged from the relevant impacted module 604 (e.g., how many database records were purged?), and volume refers to the volume (e.g., measured in gigabytes (GB) or TB) released with respect to the relevant impacted module 604 (e.g., how much space has been freed up by this round of purging?).

Accordingly, in the example of FIG. 6, module M-1 has a purge effect 606 that can be expressed as RC-1, V-1, module M-2 has a purge effect 608 that can be expressed as RC-2, V-2, module M-3 has a purge effect 610 that can be expressed as RC-3, V-3, and module M-N has a purge effect 612 that can be expressed as RC-N, V-N.

The effect of the purge operation 602 may also be expressed by considering all of the individual purge effects 606, 608, 610, 612 combined. For example, for the purge operation 602 and its input parameters (PM, U, R, D, P), the purge effect may be expressed as RC(TOTAL) and V(TO-TAL). In such a case, IM may be added to the set of input parameters such that (PM, IM, U, R, D, P) is used.

In some examples, the effects of purging can be modeled using the output features RC and V, and the purging process for a particular impacted module IM can be represented by a set of inputs (PM, U, R, D, P) and outputs (RC, V). In other examples, the effects of purging can be modeled using the output features RC and V, and the overall purging process (covering all impacted modules IM) can be represented by a set of inputs (PM, IM, U, R, D, P) and outputs (RC-TOTAL, V-TOTAL), or variations thereof, as described further below. In each case, these features may, for example, be modeled during a feature engineering 304 process as described with reference to FIG. 3.

It is noted that the combination of RC and V is a non-limiting example of a purge effect, and that various other purge effects or combinations of purge effects may be selected in other examples. For example, the combination of purge volume and data purge execution duration may be used as output data representing the purge effect.

In order to obtain a dataset with sufficient samples, a large number (e.g., thousands) of purge requests may be executed (e.g., by the purging engine 206 of FIG. 2). For example, the samples may be obtained in a data collection and prepro-cessing 302 process as described with reference to FIG. 3.

For example, for a specific primary data source PM-1, the data purging system 128 may run K number of purge jobs. For each of the purge jobs, the data purging system 128 then obtains one or more input-output pairs.

In some examples, each input-output pair is specific to an impacted module IM and has values for the input parameters (PM, U, R, D, P) and for the effects, or outputs (RC, V) on the specific impacted module IM. In other examples, each input-output pair covers all impacted modules IM and has values for the input parameters (PM, IM, U, R, D, P) and for the effects, or outputs RC(TOTAL), V(TOTAL) (or in some cases expressing both individual and total impacts using (RC, V, RC(TOTAL), V(TOTAL))).

Figure 7:
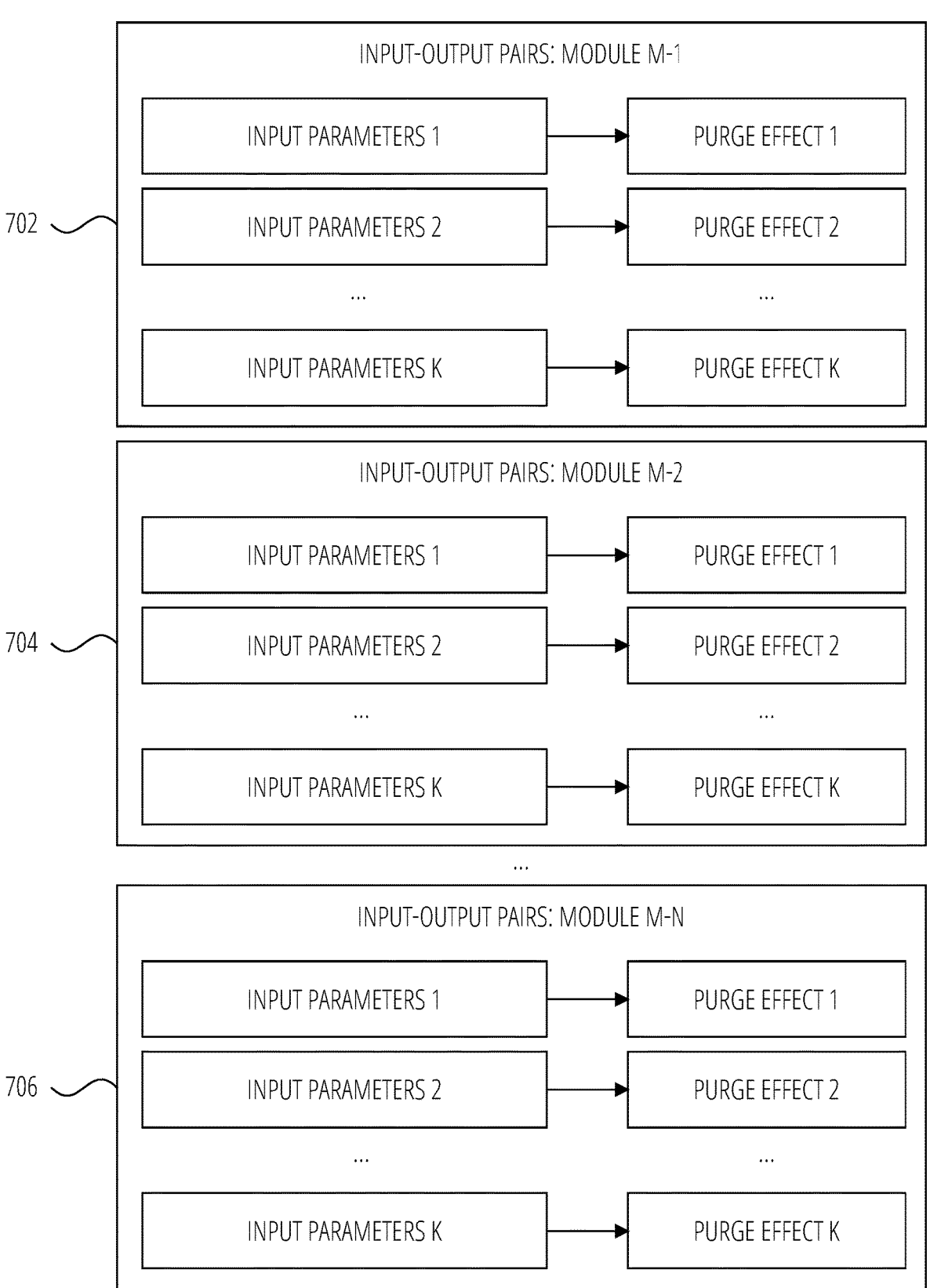
FIG. 7 diagrammatically illustrates the grouping of input-output pairs by impacted module in a machine learning model training process, according to some examples.

In cases where the input-output pairs are impacted mod-ule-specific, the input-output pairs may be extracted and arranged, or grouped, according to impacted module, as shown in FIG. 7. Specifically, FIG. 7 shows a block 702 in which input-output pairs (pairs 1 to K) for module M-1 are grouped together, a block 704 in which input-output pairs (pairs 1 to K) for module M-2 are grouped together, and a block 706 in which input-output pairs (pairs 1 to K) for module M-N are grouped together, according to some examples.

The grouped input-output pairs may then be used to train respective models, such as FNNs. Each FFN may be trained to predict, specifically, the effect of purging on a particular impacted module IM.

In cases where the input-output pairs are not impacted module-specific (e.g., where the outputs cover all impacted modules), no grouping of input-output pairs and separate models may be necessary. This is described further below.

Once a satisfactory number of samples (e.g., input-output pairs) have been obtained, machine learning model selection and training may commence (e.g., as described in the model selection and training 306 process of FIG. 3). As a non-limiting example, the training of a FNN (or multiple FNNs) based on such input-output pairs is described below.

Multiple FFNs—Each Predicting for One Impacted Module:

Where input-output pairs are specific to impacted mod-ules, multiple FNNs may be trained. Each FFN may essen-tially be trained to produce a relationship function F( ) that maps from the relevant input parameters to the selected outputs. For example, the function F( ) may be expressed as follows, where the other symbols are as defined above:

$$(RC,V)=F(PM,U,R,D,P)$$

Samples may be generated in the following format for each impacted module:

Inputs: [PM1, U1, R1, D1, P1], [PM2, U2, R2, D2, P2] . . . [PMK, UK, RK, DK, PK]; and Outputs: [RC1, V1], [RC2, V2] . . . [RCK, VK].

Single FFN for Predicting Overall Purge Effect:

Where input-output pairs cover overall purge effects, a single FNN may be trained. The FFN may essentially be trained to produce a relationship function F( ) that maps from the relevant input parameters (including IM) to the selected outputs. For example, the function F( ) may be expressed as follows, where the other symbols are as defined above:

$$(RC(TOTAL),V(TOTAL))=F(PM,IM,U,R,D,P)$$

In some cases, the function may be extended to include RC and V, where RC and V are the predicted effects only on PM, and RC(TOTAL) and V(TOTAL) are the predicted overall effects on IM (that includes PM and one or more other additional modules). In other examples, RC and V may express the individual impacts for each impact module, while RC(TOTAL) and V(TOTAL) still present totals.

$$(RC,V,RC(TOTAL),V(TOTAL))=F(PM,IM,U,R,D,P)$$

Samples may be generated in a similar format to the format shown above, with the relevant changes made to the parameters.

In both cases, samples may be converted into optimized data structures for machine learning, such as tensors (e.g., for use in the context of the PyTorch™ or TensorFlow™ machine learning libraries).

The example code below illustrates the manner in which the samples may be converted into tensors for an impacted module-specific use case (in the context of PyTorch™):

```
import torch
# Example dataset
inputs = torch.tensor([[pm1, u1, r1, d1, p1], [pm2, u2, r2,
d2, p2], ...])
# shape: (num_samples, num_features)
```

-continued

```
outputs = torch.tensor([[rc1, v1], [rc2, v2], ...])
# shape: (num_samples, num_outputs)
```

The example code below illustrates the manner in which the samples may be converted into tensors for an overall prediction use case (in the context of PyTorch™):

```
import torch
# Example dataset
inputs = torch.tensor([[pm1, im1, u1, r1, d1, p1], [pm2, im2,
u2, r2, d2, p2], ...])
# shape: (num_samples, num_features)
outputs = torch.tensor([[rctotal1, vtotal1], [rctotal2,
vtotal2], ...])
# shape: (num_samples, num_outputs)
```

The dataset (e.g., the above samples) may be split into training and testing, or validation, sets. Where multiple FNNs are trained, each dataset may be split into training and validation sets. The example code below illustrates the manner in which samples may be split, again in the context of PyTorch™:

```
from torch.utils.data import TensorDataset, DataLoader
# Define the dataset
dataset = TensorDataset(inputs, outputs)
# Split the dataset into training and testing/validation sets
train_size = int(0.8 * len(dataset))
test_size = len(dataset) − train_size
train_dataset, test_dataset =
torch.utils.data.random_split(dataset, [train_size,
test_size])
# Create data loaders
batch_size = 32
train_loader = DataLoader(train_dataset,
batch_size=batch_size, shuffle=True)
test_loader = DataLoader(test_dataset, batch_size=batch_size,
shuffle=False)
```

A suitable loss function may be used that measures the discrepancy between the predicted outputs of an FNN and the true outputs (as per the samples). Examples of loss functions include mean squared error or mean absolute error. Additionally, an optimizer, such as stochastic gradient descent or Adaptive Moment Estimation (Adam) may be selected to update the parameters of the model during training. The code below illustrates examples of a selected loss function and a selected optimizer, again in the context of PyTorch™:

```
criterion = nn.MSELoss( ) # Mean squared error loss
optimizer = torch.optim.Adam(model.parameters( ), lr=0.001) #
Adam optimizer with learning rate 0.001
```

The code below is an example of code that may be used to train a model by iterating over the training dataset, feeding the inputs through the FNN, computing loss, performing backpropagation, and updating model parameters using the selected optimizer. The process is repeated for multiple epochs to allow the FNN to learn the underlying patterns between the input data (the purge parameters) and output data (the purge effects).

```
num_epochs = 100
for epoch in range(num_epochs) :
    model.train( )
    train_loss = 0.0
    for inputs, targets in train_loader:
        optimizer.zero_grad( ) # Clear gradients
        # Forward pass
        outputs = model(inputs)
        # Compute loss
        loss = criterion(outputs, targets)
        train_loss += loss.item( ) * inputs.size(0)
        # Backward pass and optimization
        loss.backward( )
        optimizer.step( )
    # Compute average training loss for the epoch
    train_loss /= len(train_dataset)
    # Print training progress
    print(f"Epoch [{epoch+1}/{num_epochs}], Train Loss:
{train_loss:.4f}")
```

After training, the effectiveness or performance of the trained FNN may be evaluated (e.g., as described in the model evaluation 308 process of FIG. 3). The code below is an example of code that may be used to iterate over the dataset, pass inputs through the trained FNN, and then compare the predicted outputs with the true outputs. Metrics, such as mean squared error or mean absolute error, may be used to assess performance.

```
model.eval( )
test_loss = 0.0
with torch.no_grad( ) :
    for inputs, targets in test_loader:
        outputs = model(inputs)
        loss = criterion(outputs, targets)
        test_loss += loss.item( ) * inputs.size(0)
test_loss /= len(test_dataset)
print(f"Test Loss: {test_loss:.4f}")
```

As mentioned with reference to FIG. 3, validation, refinement or retraining 312 may be performed prior to deployment 314. The FNN may then be deployed to predict purge effects based on the historical purge data on which it was trained. For example, the FNN may be deployed using the purge effect prediction component 204 of the data purging system 128 of FIG. 2, as described further below.

Figure 8:
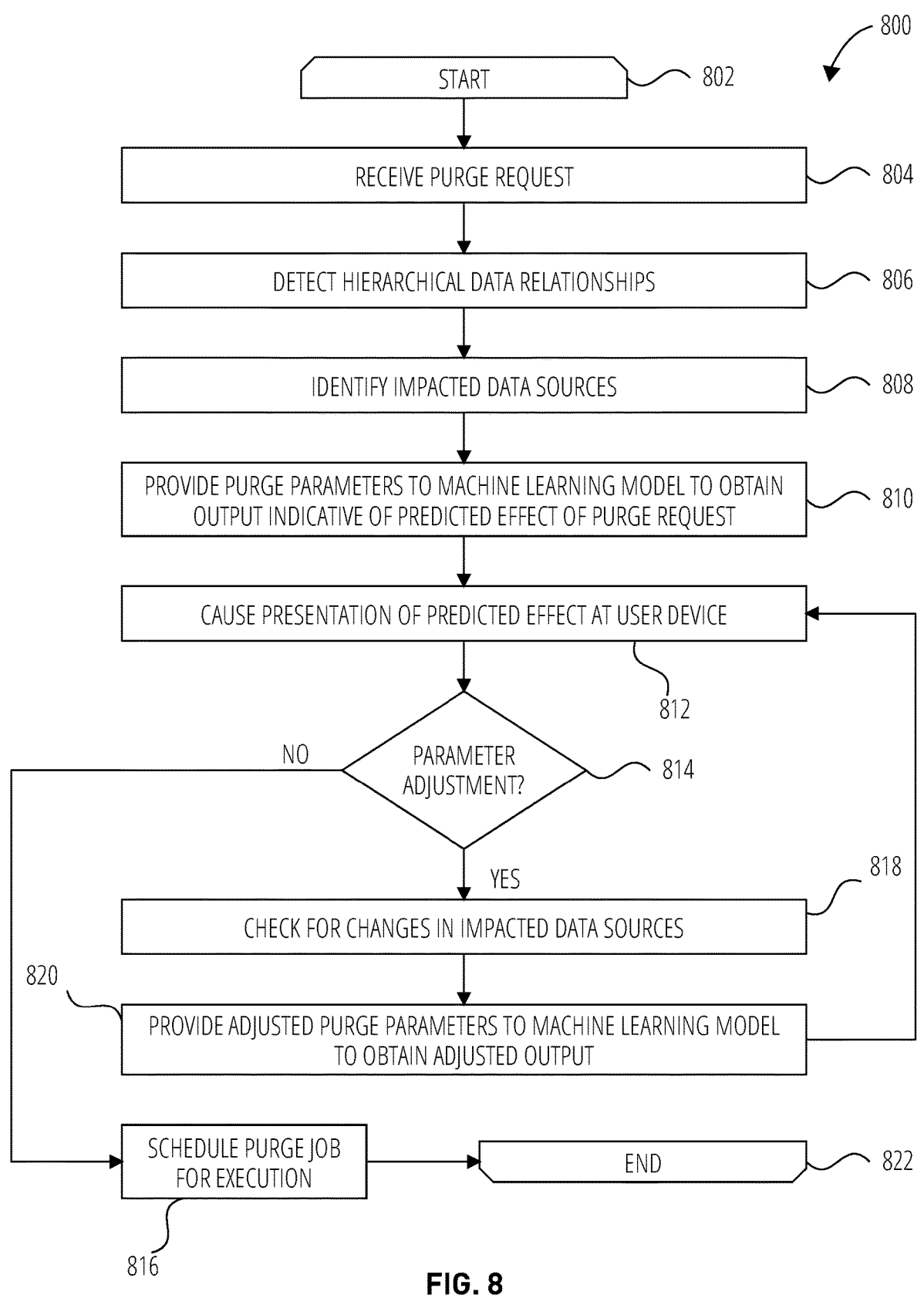
FIG. 8 is a flowchart illustrating operations of a method suitable for automatically predicting an effect of execution of a purge request on a plurality of impacted data sources, according to some examples.

FIG. 8 is a flowchart illustrating operations of a method 800 suitable for automatically predicting an effect of execution of a purge request on a plurality of impacted data sources, according to some examples. Aspects of the method 800 may be performed by components, devices, systems, data structures, interfaces, or entities shown in FIGS. 1 and 2. Accordingly, by way of example and not limitation, the method 800 is described with reference to certain elements of FIGS. 1 and 2. Further, reference is made to elements shown in FIGS. 9 and 10 to illustrate certain user interface-related examples in a non-limiting fashion. While some operations are described as being performed with respect to a plurality of data items or data sources, it shall be appreciated that similar operations may be performed with respect to individual data items or data sources.

The method 800 commences at opening loop element 802 and proceeds to operation 804, where a data purging system (e.g., the data purging system 128 of FIG. 1 and FIG. 2) receives a purge request from a user device (e.g., the user device 106 of the user 130 of FIG. 1). The user 130 may create a new purge request or adjust an existing purge request (e.g., adapt a previously stored purge policy). For example, the user 130 may access the purge management interface 216 of FIG. 2 that is presented via the purge job previewer 210 to create or adjust a purge request.

Figure 9:
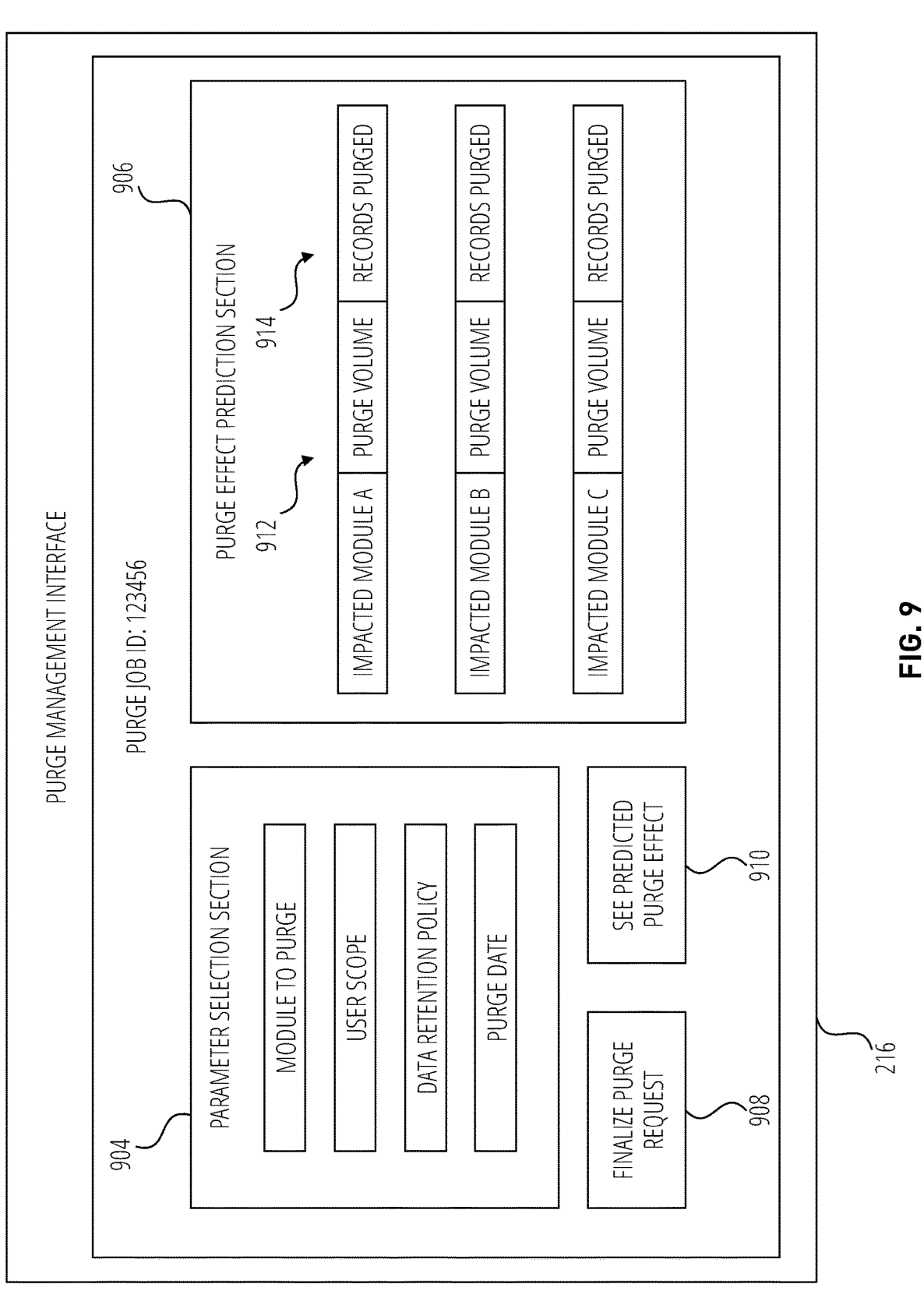
FIG. 9 is a user interface diagram illustrating a purge management interface that may present a purge effect prediction relating to a purge request, according to some examples.

FIG. 9 illustrates the purge management interface 216 of FIG. 2, according to some examples. The purge management interface 216 is shown in FIG. 9 as a graphical user interface depicted on a display of the user device 106. The purge management interface 216 presents a parameter selection section 904 where the user 130 can input or select values for various purge parameters, such as which data source to purge (e.g., the primary data source or target data source), user scope, data retention details, and purge date.

For example, the user 130 selects to purge a time management module of a cloud-based service, sets the user scope as "only inactive users," confirms the data retention policy as "inactive for more than 1 year," and specifies the purge date as the next day. Referring back to FIG. 8, at operation 806, the data purging system 128 detects hierarchical data relationships that will impact one or more other data sources associated with the user account of the user 130.

For example, the data purging system 128 may detect hierarchical data relationships between master or parent data (that fall in the scope of the purge request) in a selected primary data source and dependent or child data in other data sources. In the case of the time management module, for instance, the data purging system 128 may detect that the purging of the relevant items from the time management module will also result in purging of items from a performance management module and a capacity planning module.

The method 800 proceeds to operation 808, where the data purging system 128 identifies a set of impacted data sources based on the hierarchical data relationships (e.g., on one or more parent-child relationships between first data items of a selected primary data source that fall within the scope of the purge request, and second data items of the one or more secondary or additional data sources). For example, a selected functional module may contain master data or parent data which, in order to be purged by the purging engine 206, will also require purging of dependent or child data from other impacted modules.

At operation 810, the data purging system 128 provides the purge parameters to a machine learning model to obtain output indicative of a predicted effect of the purge request. The machine learning model may be a machine learning model trained according to one or more of the examples provided herein.

In a first example, the purge request handling component 202 of FIG. 2 may provide values of the purge parameters, as selected by the user 130, to the purge effect prediction component 204. The purge effect prediction component 204 may run a machine learning model (e.g., one or more deployed FNNs trained on historical purge data as described above) to obtain output. For example, where the function below is used, inputs are the values for the primary data source (PM), user scope (U), retention criteria (R), and purge date (D), and the output may be the predicted record count (RC) and purge volume (V) for a particular impacted module.

$$(RC,V)=F(PM,U,R,D)$$

The machine learning model then separately predicts a data source-specific effect for each impacted data source. For example, separate predictions may be generated for "Impacted Module A" (e.g., time management module), "Impacted Module B" (e.g., performance management module), and "Impacted Module C" (e.g., capacity planning module), as shown in FIG. 9.

In another example, the purge request handling component 202 of FIG. 2 may provide values of the purge parameters, as selected by the user 130, to the purge effect prediction component 204, together with an indication of the impacted data sources IM. The purge effect prediction component 204 may run the machine learning model to obtain output. For example, where the function below is used, inputs are the values for the primary data source (PM), impacted data sources (IM), user scope (U), retention criteria (R), and purge date (D), and the output may be the overall predicted record count (RC) and overall purge volume (V).

$$(RC(TOTAL),V(TOTAL))=F(PM,IM,U,R,D)$$

Figure 10:
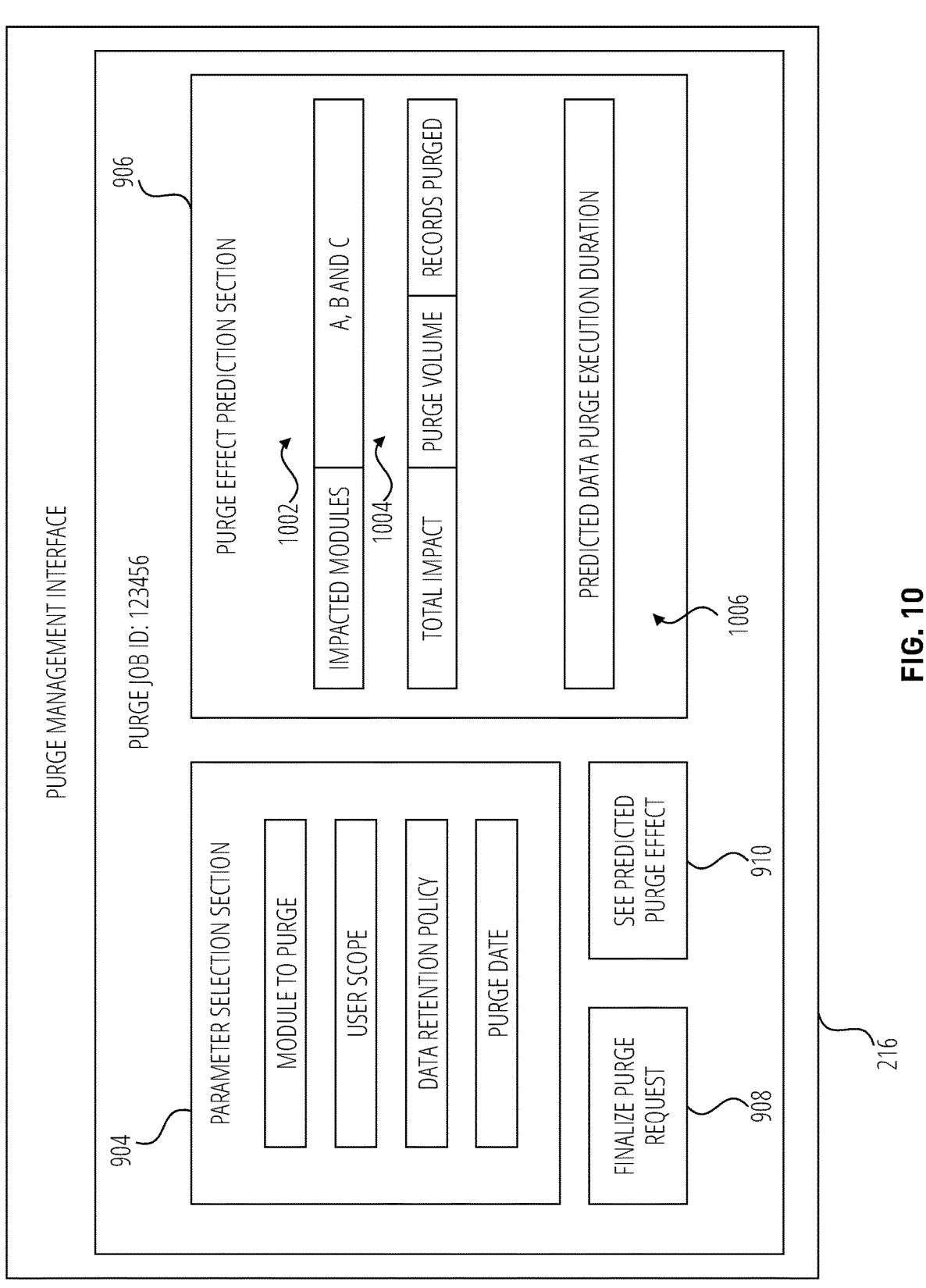
FIG. 10 is a user interface diagram illustrating a purge management interface that may present a purge effect prediction relating to a purge request, according to some examples.

The machine learning model then generates an overall prediction that covers all the impacted data sources. For example, the machine learning model may predict the total number of records purged and total volume freed up across all impacted data sources, as shown in FIG. 10 (which is described further below).

The method 800 proceeds to operation 812, where the predicted effect, or outcome of the purge request, is caused to be presented at the user device 106. Presentation may vary, depending, for example, on the types of predictions made.

Referring again to the purge management interface 216 as shown in FIG. 9, the user 130 may select a finalize button 908 to finalize and submit the purge request, or a predicted effect button 910 to first receive the predicted effect as generated by the data purging system 128. If the user 130 selects the predicted effect button 910, the data purging system 128 generates the predicted effect and presents the output in a purge effect prediction section 906 of the purge management interface 216.

In the example of FIG. 9, the purge effect prediction section 906 displays a list of impacted modules, and for each module, displays a predicted purge volume 912 and a predicted number of data items purged 914. Accordingly, in the example of FIG. 9, the purge effect prediction section 906 displays predictions as data source-specific effects.

Another example of the purge management interface 216 is shown in FIG. 10. The purge management interface 216 shown in FIG. 10 is similar to the purge management interface 216 shown in FIG. 9, and like reference numerals refer to like user interface elements. However, the purge management interface 216 of FIG. 10 presents, in the purge effect prediction section 906, overall predictions as opposed to predictions of data source-specific effect. Specifically, in FIG. 10, the purge effect prediction section 906 identifies the impacted modules 1002 (A, B, and C) and presents a predicted overall purge effect 1004 by indicating the overall predicted purge volume and the overall number of data items expected to be purged. Furthermore, where an interface such as the purge management interface 216 of FIG. 10 is employed, the machine learning model may generate an overall prediction, based on the historical purge data, for the time that the purge job will take to complete. A predicted data purge execution duration 1006 is therefore also shown in the purge effect prediction section 906 of FIG. 10.

In some examples, the method 800 may include predicting both data source-specific effects and overall effects (e.g., using the machine learning model), and presenting both in an interface such as the purge management interface 216. In some cases, the method 800 may include predicting data source-specific effects and then combining or aggregating them to obtain overall effect predictions.

Referring back to the method 800 of FIG. 8, the user 130 may then decide to submit or finalize the purge request, or adjust the purge parameters. If the user 130 submits the purge request and performs no parameter adjustment (decision operation 814), the purge request is scheduled for execution at operation 816. As mentioned, the data purging system 128 may utilize the predicted effect, as generated by the purge effect prediction component 204, to schedule the purge request (e.g., using the purge job scheduler 212) by matching its expected source requirements to available computing resources. The purging engine 206 then executes (e.g., processes and completes) the purge request according to the selected purge parameters. The purge may, for example, be a hard purge or a soft purge of the in-scope data items.

On the other hand, if the user 130 adjusts the purge parameters (and, for example, selects the predicted effect button 910 again), the data purging system 128 detects (at decision operation 814) that the user 130 has made adjustments, and checks for any changes in the impacted data sources at operation 818. For example, the user 130 may adjust the purge parameters in the parameter selection section 904 to narrow the scope of the purge request, resulting in one or more previously impacted data sources no longer being impacted by the purge request. This may in turn change the predicted effects of the proposed purge.

Further, based on the adjusted purge parameters, the purge request handling component 202 may provide adjusted input to the machine learning model to obtain adjusted output at operation 820. The adjusted output is indicative of a predicted effect for the adjusted purge parameters. The method 800 proceeds back to operation 812, where the predicted effect (in this case being the predicted effect for the adjusted purge parameters) is presented to the user 130 (e.g., by updating the purge effect prediction section 906 of the purge management interface 216). In this way, the user 130 can understand, or obtain a preview of, the impact of the parameter adjustments on the expected output, such as the expected purge volume or the expected numbers of data items purged. Once the user 130 is satisfied with the selected purge parameters, the purge request may be finalized and submitted. The method 800 ends at closing loop element 822.

With access to predictive insights, such as those described herein, users may be enabled to plan and schedule upcoming data purges more strategically. Various factors, such as the expected volume or duration, may be previewed to properly size and time the purge jobs. This may avoid issues, such as inefficiently overestimating or underestimating server resources required. It may also prevent situations where a user account exceeds storage limits or becomes blocked (e.g., a user may more effectively plan and arrange their storage plan against a quote or contract). The predictive insights may also improve automatic functioning of the data purging system 128 of FIG. 1, e.g., its scheduling or resource-allocation functions.

Beyond individual job planning, a predictive model may provide overviews into wider data trends. Such trends may include, for example, growth rates of data volumes across functional modules or storage systems. For example, the purge management interface 216 of FIG. 2 may provide a user with a graphical illustration of storage increase rates on a per-data source basis. This may improve capacity and budgeting oversight. Additionally, predictions may assist with identifying abnormal activity and allow for preemptive action to troubleshoot issues, such as system bugs, business process errors, or configuration errors.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: receiving, from a user device, a purge request that comprises a set of purge parameters, the purge parameters identifying a data source and defining one or more purge criteria for purging of data items of the data source; identifying, based on one or more hierarchical data relationships held by the data items of the data source, a plurality of impacted data sources, the impacted data sources including the data source and one or more additional data sources; providing the purge parameters to a machine learning model to obtain output indicative of a predicted effect of execution of the purge request on the impacted data sources, the machine learning model being trained on historical purge data; and causing presentation of the predicted effect at the user device prior to the execution of the purge request.

In Example 2, the subject matter of Example 1 includes, wherein the data items are first data items, the operations further comprising: detecting the one or more hierarchical data relationships based on one or more parent-child relationships between the first data items and second data items of the one or more additional data sources.

In Example 3, the subject matter of any of Examples 1-2 includes, wherein the predicted effect is a first predicted effect, the operations further comprising: receiving, from the user device, user input to adjust the set of purge parameters of the purge request; in response to receiving the user input, adjusting the purge parameters; providing the adjusted purge parameters to the machine learning model to obtain adjusted output indicative of a second predicted effect of the execution of the purge request; and causing presentation of the second predicted effect at the user device prior to the execution of the purge request.

In Example 4, the subject matter of Example 3 includes, wherein the impacted data sources comprise a first set of impacted data sources, the adjustment of the set of purge parameters causes identification of a second set of impacted data sources, and the adjusted output is indicative of the second predicted effect of the execution of the purge request on the second set of impacted data sources.

In Example 5, the subject matter of any of Examples 1-4 includes, wherein the predicted effect comprises a data source-specific effect for each of the impacted data sources.

In Example 6, the subject matter of Example 5 includes, wherein the causing of the presentation of the predicted effect at the user device comprises causing presentation of the data source-specific effect for each of the impacted data sources separately within a graphical user interface.

In Example 7, the subject matter of any of Examples 1-6 includes, wherein the predicted effect comprises an overall effect covering the plurality of impacted data sources.

In Example 8, the subject matter of any of Examples 1-7 includes, wherein the set of purge parameters comprises at least one of: an identifier of the data source, the one or more purge criteria, user data, a purge scope, a data retention policy, a purge date, or a purge time.

In Example 9, the subject matter of any of Examples 1-8 includes, wherein the providing of the purge parameters to the machine learning model comprises providing, to the machine learning model, the purge parameters from the purge request together with one or more additional purge parameters that identify at least a subset of the impacted data sources.

In Example 10, the subject matter of any of Examples 1-9 includes, wherein the predicted effect comprises at least one of: a predicted purge volume, a predicted number of data items purged, or a predicted data purge execution duration.

In Example 11, the subject matter of any of Examples 1-10 includes, the operations further comprising: scheduling, based on the predicted effect, the execution of the purge request; and performing, by a processor-implemented purging component, the execution of the purge request in accordance with the scheduling.

In Example 12, the subject matter of any of Examples 1-11 includes, wherein each impacted data source corresponds to a respective functional module of a cloud-based service, and the user device is associated with a user account held with the cloud-based service.

In Example 13, the subject matter of any of Examples 1-12 includes, wherein the historical purge data comprises a plurality of input-output pairs, each input-output pair including a set of purge parameters and at least one corresponding purge effect, the purge parameters including a target data source for a purge request associated with the input-output pair.

In Example 14, the subject matter of any of Examples 1-13 includes, wherein the machine learning model comprises at least one feedforward neural network (FNN).

Example 15 is a method comprising: receiving, from a user device, a purge request that comprises a set of purge parameters, the purge parameters identifying a data source and defining one or more purge criteria for purging of data items of the data source; identifying, based on one or more hierarchical data relationships held by the data items of the data source, a plurality of impacted data sources, the impacted data sources including the data source and one or more additional data sources; providing the purge parameters to a machine learning model to obtain output indicative of a predicted effect of execution of the purge request on the impacted data sources, the machine learning model being trained on historical purge data; and causing presentation of the predicted effect at the user device prior to the execution of the purge request.

In Example 16, the subject matter of Example 15 includes, wherein the predicted effect is a first predicted effect, the method further comprising: receiving, from the user device, user input to adjust the set of purge parameters of the purge request; in response to receiving the user input, adjusting the purge parameters; providing the adjusted purge parameters to the machine learning model to obtain adjusted output indicative of a second predicted effect of the execution of the purge request; and causing presentation of the second predicted effect at the user device prior to the execution of the purge request.

In Example 17, the subject matter of any of Examples 15-16 includes, wherein the providing of the purge parameters to the machine learning model comprises providing, to the machine learning model, the purge parameters from the purge request together with one or more additional purge parameters that identify at least a subset of the impacted data sources.

Example 18 is a non-transitory computer-readable medium that stores instructions that, when executed by one or more processors, cause the one or more processors to perform operations comprising: receiving, from a user device, a purge request that comprises a set of purge parameters, the purge parameters identifying a data source and defining one or more purge criteria for purging of data items of the data source; identifying, based on one or more hierarchical data relationships held by the data items of the data source, a plurality of impacted data sources, the impacted data sources including the data source and one or more additional data sources; providing the purge parameters to a machine learning model to obtain output indicative of a predicted effect of execution of the purge request on the impacted data sources, the machine learning model being trained on historical purge data; and causing presentation of the predicted effect at the user device prior to the execution of the purge request.

In Example 19, the subject matter of Example 18 includes, wherein the predicted effect is a first predicted effect, the operations further comprising: receiving, from the user device, user input to adjust the set of purge parameters of the purge request; in response to receiving the user input, adjusting the purge parameters; providing the adjusted purge parameters to the machine learning model to obtain adjusted output indicative of a second predicted effect of the execution of the purge request; and causing presentation of the second predicted effect at the user device prior to the execution of the purge request.

In Example 20, the subject matter of any of Examples 18-19 includes, wherein the providing of the purge parameters to the machine learning model comprises providing, to the machine learning model, the purge parameters from the purge request together with one or more additional purge parameters that identify at least a subset of the impacted data sources.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 11:
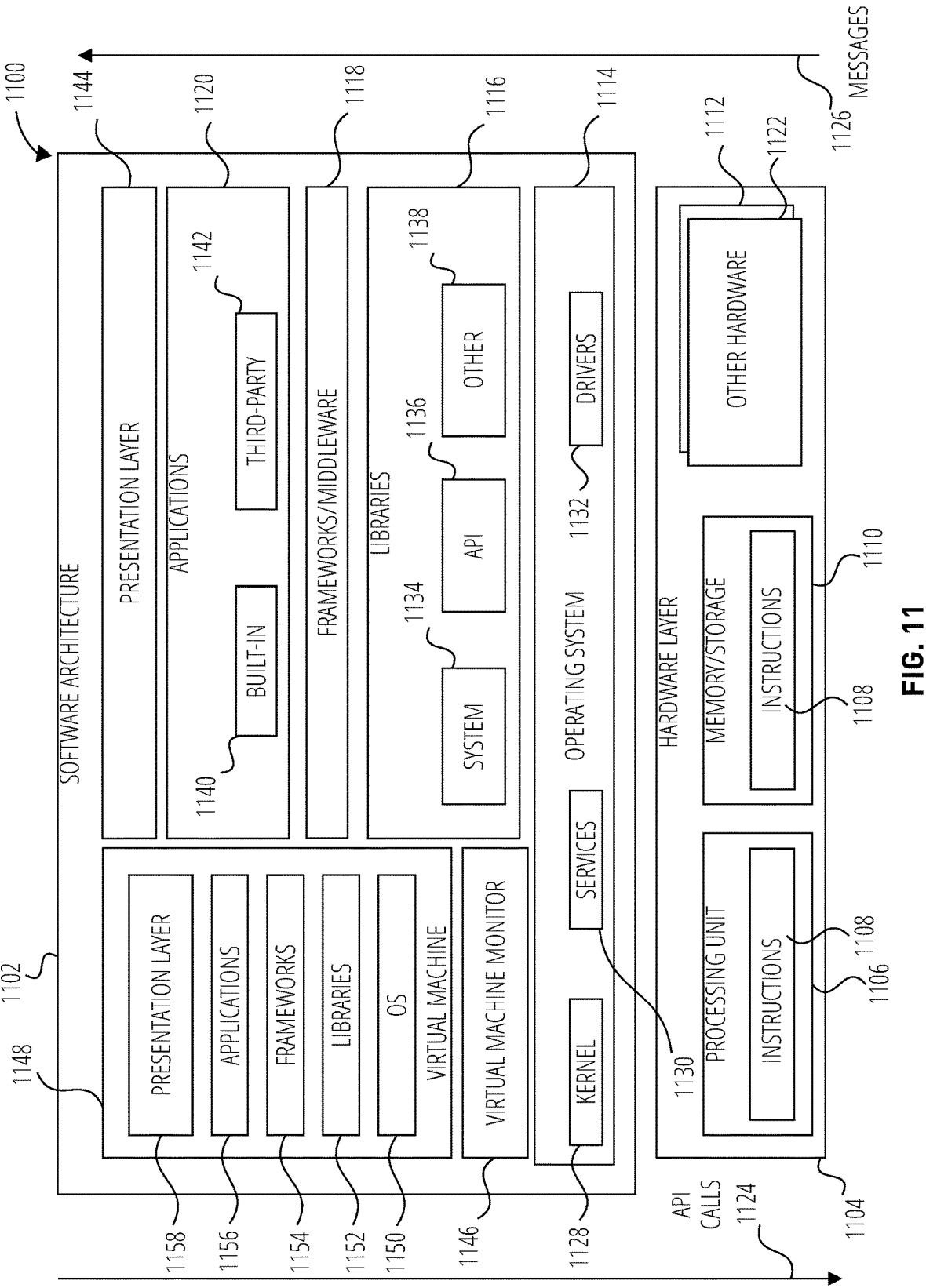
FIG. 11 is a block diagram showing a software architecture for a computing device, according to some examples.

FIG. 11 is a block diagram 1100 showing a software architecture 1102 for a computing device, according to some examples. The software architecture 1102 may be used in conjunction with various hardware architectures, for example, as described herein. FIG. 11 is merely a non-limiting illustration of a software architecture, and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 12.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 and other hardware 1122 which represent any other hardware of the hardware layer 1104, such as the other hardware illustrated as part of the software architecture 1102.

In the architecture of FIG. 11, the software architecture 1102 may be conceptualized as a stack of layers where each layer provides particular functionality. For example, the software architecture 1102 may include layers such as an operating system 1114, libraries 1116, frameworks/middleware layer 1118, applications 1120, and presentation layer 1144. Operationally, the applications 1120 or other components within the layers may invoke API calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the software architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 1116 may provide a common infrastructure that may be utilized by the applications 1120 or other components or layers. The libraries 1116 typically provide functionality that allows other software modules to perform tasks in an easier fashion than to interface directly with the underlying operating system 1114 functionality (e.g., kernel 1128, services 1130 or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware layer 1118 may provide a higher-level common infrastructure that may be utilized by the applications 1120 or other software components/modules. For example, the frameworks/middleware layer 1118 may provide various graphic user interface (GUI) functions, high-level resource management, high-level location services, and so forth. The frameworks/middleware layer 1118 may provide a broad spectrum of other APIs that may be utilized by the applications 1120 or other software components/modules, some of which may be specific to a particular operating system or platform.

The applications 1120 include built-in applications 1140 or third-party applications 1142. Examples of representative built-in applications 1140 may include, but are not limited to, a contacts application, a browser application, a book reader application, a location application, a media application, a messaging application, or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 or drivers 1132), libraries (e.g., system libraries 1134, API libraries 1136, and other libraries 1138), and frameworks/middleware layer 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (e.g., operating system 1114). A software architecture executes within the virtual machine 1148 such as an operating system 1150, libraries 1152, frameworks/middleware 1154, applications 1156 or presentation layer 1158. These layers of software architecture executing within the virtual machine 1148 can be the same as corresponding layers previously described or may be different.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise, a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (Saas)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 12:
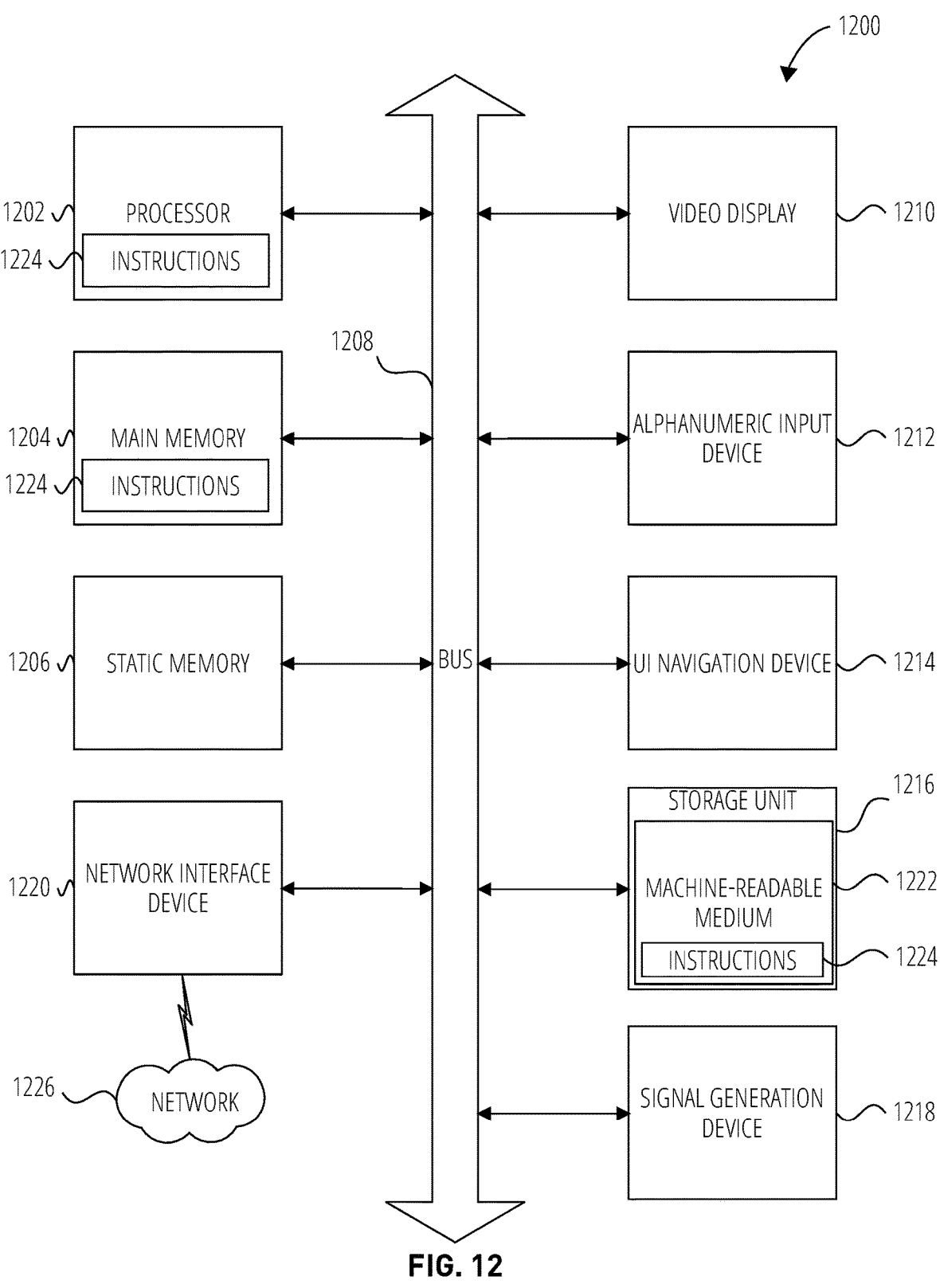
FIG. 12 is a block diagram of a machine in the form of a computer system, according to some examples, within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a GPU, or both), a primary or main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a UI navigation (or cursor control) device 1214 (e.g., a mouse), a storage unit 1216, a signal generation device 1218 (e.g., a speaker), and a network interface device 1220.

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 or within the processor 1202 during execution thereof by the computer system 1200, with the main memory 1204 and the processor 1202 also each constituting a machine-readable medium 1222.

While the machine-readable medium 1222 is shown in accordance with some examples to be a single medium, the term "machine-readable medium" may include a single medium or multiple media (e.g., a centralized or distributed database, or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of a machine-readable medium 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1224 may further be transmitted or received over a communications network 1226 using a transmission medium. The instructions 1224 may be transmitted using the network interface device 1220 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 1224 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. As used herein, the conjunction "or" refers to a non-exclusive "or," unless specifically stated otherwise.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

As used in this disclosure, the term "machine learning model" (or simply "model") may refer to a single, standalone model, or a combination of models. The term may also refer to a system, component or module that includes a machine learning model together with one or more supporting or supplementary components that do not necessarily perform machine learning tasks.

What is claimed is:

1. A system comprising:
at least one memory that stores instructions; and
one or more processors configured by the instructions to perform operations comprising:
receiving, from a user device, a purge request that comprises a set of purge parameters, the set of purge parameters identifying a data source and defining one or more purge criteria for purging of data items of the data source;
detecting one or more hierarchical data relationships based on one or more parent-child relationships between the data items and additional data items of one or more additional data sources;
identifying, based on the one or more hierarchical data relationships held by the data items of the data source, a plurality of impacted data sources, the plurality of impacted data sources including the data source and the one or more additional data sources;
generating, by a machine learning model that processes the set of purge parameters, output indicative of a predicted effect of execution of the purge request on the plurality of impacted data sources, the machine learning model being trained on historical purge data comprising a plurality of input-output pairs, each input-output pair including:
as training input, respective purge parameters identifying a target data source for a specific historical purge request associated with the input-output pair, wherein the target data source is a primary data source targeted by the specific historical purge request, and
as training output, at least one corresponding purge effect comprising one or both of purge volume of a historical data purge resulting from the specific historical purge request associated with the input-output pair or a number of data items purged in the historical data purge;
causing presentation of the predicted effect at the user device prior to the execution of the purge request; and
executing the purge request by purging data items from at least the data source identified by the purge request.

2. The system of claim 1, wherein the predicted effect is a first predicted effect, the operations further comprising:
receiving, from the user device, user input to adjust the set of purge parameters of the purge request;
in response to receiving the user input, adjusting the set of purge parameters to obtain adjusted purge parameters;
providing the adjusted purge parameters to the machine learning model to obtain adjusted output indicative of a second predicted effect of the execution of the purge request; and
causing presentation of the second predicted effect at the user device prior to the execution of the purge request.

3. The system of claim 2, wherein the plurality of impacted data sources comprise a first set of impacted data sources, the adjustment of the set of purge parameters causes identification of a second set of impacted data sources, and the adjusted output is indicative of the second predicted effect of the execution of the purge request on the second set of impacted data sources.

4. The system of claim 1, wherein the predicted effect comprises a data source-specific effect for each of the plurality of impacted data sources.

5. The system of claim 4, wherein the causing of the presentation of the predicted effect at the user device comprises causing presentation of the data source-specific effect for each of the plurality of impacted data sources separately within a graphical user interface.

6. The system of claim 1, wherein the predicted effect comprises an overall effect covering the plurality of impacted data sources.

7. The system of claim 1, wherein the set of purge parameters comprises at least one of: an identifier of the data source, the one or more purge criteria, user data, a purge scope, a data retention policy, a purge date, or a purge time.

8. The system of claim 1, wherein the operations comprise providing, to the machine learning model, the set of purge parameters from the purge request together with one or more additional purge parameters that identify at least a subset of the plurality of impacted data sources.

9. The system of claim 1, wherein the predicted effect comprises at least one of: a predicted purge volume, a predicted number of data items purged, or a predicted data purge execution duration.

10. The system of claim 1, the operations further comprising:

scheduling, based on the predicted effect, the execution of the purge request.

11. The system of claim 1, wherein each impacted data source corresponds to a respective functional module of a cloud-based service, and the user device is associated with a user account held with the cloud-based service.

12. The system of claim 1, wherein the machine learning model comprises at least one feedforward neural network (FNN).

13. A method comprising:

receiving, from a user device, a purge request that comprises a set of purge parameters, the set of purge parameters identifying a data source and defining one or more purge criteria for purging of data items of the data source;

detecting one or more hierarchical data relationships based on one or more parent-child relationships between the data items and additional data items of one or more additional data sources;

identifying, based on the one or more hierarchical data relationships held by the data items of the data source, a plurality of impacted data sources, the plurality of impacted data sources including the data source and the one or more additional data sources;

generating, by a machine learning model that processes the set of purge parameters, output indicative of a predicted effect of execution of the purge request on the plurality of impacted data sources, the machine learning model being trained on historical purge data comprising a plurality of input-output pairs, each input-output pair including:

as training input, respective purge parameters identifying a target data source for a specific historical purge request associated with the input-output pair, wherein the target data source is a primary data source targeted by the specific historical purge request, and as training output, at least one corresponding purge effect comprising one or both of purge volume of a historical data purge resulting from the specific historical purge request associated with the input-output pair or a number of data items purged in the historical data purge;

causing presentation of the predicted effect at the user device prior to the execution of the purge request; and executing the purge request by purging data items from at least the data source identified by the purge request.

14. The method of claim 13, wherein the predicted effect is a first predicted effect, the method further comprising:

receiving, from the user device, user input to adjust the set of purge parameters of the purge request;

in response to receiving the user input, adjusting the set of purge parameters to obtain adjusted purge parameters;

providing the adjusted purge parameters to the machine learning model to obtain adjusted output indicative of a second predicted effect of the execution of the purge request; and causing presentation of the second predicted effect at the user device prior to the execution of the purge request.

15. The method of claim 13, comprising providing, to the machine learning model, the set of purge parameters from the purge request together with one or more additional purge parameters that identify at least a subset of the plurality of impacted data sources.

16. A non-transitory computer-readable medium that stores instructions that, when executed by one or more processors, cause the one or more processors to perform operations comprising:

receiving, from a user device, a purge request that comprises a set of purge parameters, the set of purge parameters identifying a data source and defining one or more purge criteria for purging of data items of the data source;

detecting one or more hierarchical data relationships based on one or more parent-child relationships between the data items and additional data items of one or more additional data sources;

identifying, based on the one or more hierarchical data relationships held by the data items of the data source, a plurality of impacted data sources, the plurality of impacted data sources including the data source and the one or more additional data sources;

generating, by a machine learning model that processes the set of purge parameters, output indicative of a predicted effect of execution of the purge request on the plurality of impacted data sources, the machine learning model being trained on historical purge data comprising a plurality of input-output pairs, each input-output pair including:

as training input, respective purge parameters identifying a target data source for a specific historical purge request associated with the input-output pair, wherein the target data source is a primary data source targeted by the specific historical purge request, and as training output, at least one corresponding purge effect comprising one or both of purge volume of a historical data purge resulting from the specific historical purge request associated with the input-output pair or a number of data items purged in the historical data purge;

causing presentation of the predicted effect at the user device prior to the execution of the purge request; and executing the purge request by purging data items from at least the data source identified by the purge request.

17. The non-transitory computer-readable medium of claim 16, wherein the predicted effect is a first predicted effect, the operations further comprising:

receiving, from the user device, user input to adjust the set of purge parameters of the purge request;

in response to receiving the user input, adjusting the set of purge parameters to obtain adjusted purge parameters;

providing the adjusted purge parameters to the machine learning model to obtain adjusted output indicative of a second predicted effect of the execution of the purge request; and causing presentation of the second predicted effect at the user device prior to the execution of the purge request.

18. The non-transitory computer-readable medium of claim 16, wherein the operations comprise providing, to the machine learning model, the set of purge parameters from the purge request together with one or more additional purge parameters that identify at least a subset of the plurality of impacted data sources.

\* \* \* \* \*